United States Patent
Mogi et al.

(10) Patent No.: US 6,944,711 B2
(45) Date of Patent: Sep. 13, 2005

(54) CACHE MANAGEMENT METHOD FOR STORAGE DEVICE

(75) Inventors: Kazuhiko Mogi, Yokohama (JP); Norifumi Nishikawa, Machida (JP); Yoshiaki Eguchi, Machida (JP)

(73) Assignee: Hitachi, Ltd., Tokyo (JP)

( * ) Notice: Subject to any disclaimer, the term of this patent is extended or adjusted under 35 U.S.C. 154(b) by 115 days.

(21) Appl. No.: 10/646,699

(22) Filed: Aug. 25, 2003

(65) Prior Publication Data

US 2004/0193803 A1 Sep. 30, 2004

(30) Foreign Application Priority Data

Mar. 28, 2003 (JP) ........................................ 2003-090360

(51) Int. Cl.[7] .............................................. G06F 17/30
(52) U.S. Cl. ..................... 711/113; 711/118; 711/129; 711/128; 707/200; 707/205
(58) Field of Search ................................ 711/118, 128, 711/129, 136, 170, 173; 707/200, 205, 1, 3

(56) References Cited

U.S. PATENT DOCUMENTS

| | | | | |
|---|---|---|---|---|
| 4,463,424 A | * | 7/1984 | Mattson et al. | 711/136 |
| 4,947,319 A | | 8/1990 | Bozman | 711/118 |
| 5,434,992 A | | 7/1995 | Mattson | 711/136 |
| 5,537,635 A | | 7/1996 | Douglas | 711/129 |
| 5,566,315 A | | 10/1996 | Milillo et al. | 711/113 |
| 5,675,797 A | | 10/1997 | Chung et al. | 718/104 |
| 5,717,893 A | | 2/1998 | Mattson | 711/129 |
| 5,852,818 A | * | 12/1998 | Guay et al. | 707/1 |
| 5,897,634 A | * | 4/1999 | Attaluri et al. | 707/8 |
| 5,918,225 A | * | 6/1999 | White et al. | 707/3 |
| 5,918,249 A | * | 6/1999 | Cox et al. | 711/203 |
| 6,021,408 A | * | 2/2000 | Ledain et al. | 707/8 |
| 6,035,306 A | * | 3/2000 | Lowenthal et al. | 707/200 |
| 6,061,763 A | | 5/2000 | Rubin et al. | 711/129 |
| 6,119,118 A | * | 9/2000 | Kain et al. | 707/10 |
| 6,421,761 B1 | | 7/2002 | Arimilli et al. | 711/128 |
| 6,470,423 B1 | | 10/2002 | Ho et al. | 711/129 |
| 6,493,810 B1 | * | 12/2002 | Pang et al. | 711/170 |

FOREIGN PATENT DOCUMENTS

| | | |
|---|---|---|
| JP | 2003-150418 | 5/2003 |
| JP | 2003-150419 | 5/2003 |

OTHER PUBLICATIONS

USENIX Annual Technical Conference (USENIX 2002), Jun. 10–15, 2002, T. Wong et al, pp. 161–165.

* cited by examiner

*Primary Examiner*—T Nguyen
(74) *Attorney, Agent, or Firm*—Mattingly, Stanger, Malur & Brundidge, P.C.

(57) ABSTRACT

A cache management method disclosed herein enables optimal cache space settings to be provided on a storage device in a computer system where database management systems (DBMSs) run. Through the disclosed method, cache space partitions to be used per data set are set, based on information about processes to be executed by the DBMSs, which is given as design information. For example, based on estimated rerun time of processes required after DBMS abnormal termination, cache space is adjusted to serve the needs of logs to be output from the DBMS. In another example, initial cache space allocations for table and index data is optimized, based on process types and approximate access characteristics of data. In yet another example, from a combination of results of pre-analysis of processes and cache operating statistics information, a change in process execution time by cache space tuning is estimated and a cache effect is enhanced.

29 Claims, 25 Drawing Sheets

FIG. 5

DATA STGE. LOCATION INFO (342)

| DATA STRUCTURE NAME (346) | DATA STGE. LOCATION (348) | |
| --- | --- | --- |
| | DATA FILE PATHNAME | BLOCK NUMBER |
| T1 | /dev/rdsk/lvol0 | 0-499 |
| | /dev/rdsk/lvol0 | 2000-2499 |
| T2 | /dev/rdsk/lvol0 | 500-799 |
| T3 | /dev/rdsk/lvol1 | 500-799 |
| ⋮ | ⋮ | ⋮ |

FIG. 6

ATTRIBUTE DATA SIZE INFO (350)

| DATA STRUCTURE NAME (346) | ATTRIBUTE NAME (352) | MAX SIZE (354) |
| --- | --- | --- |
| T1 | ID1 | 12 Bytes |
| | ID2 | 10 Bytes |
| | ⋮ | ⋮ |
| T2 | ID2 | 10 Bytes |
| | ⋮ | ⋮ |
| ⋮ | ⋮ | ⋮ |

FIG.13

| CACHE GROUP ID | CGrp0 | CGrp1 | ··· | ~462 |
|---|---|---|---|---|
| CACHE SPACE | 1024MB | 2048MB | ··· | ~466 |
| LU ID | LU0,LU2,LU3,··· | LU1 | ··· | ~364 |
| HINT FUNCTION | OFF | ON | ··· | ~468 |

CACHE GROUP INFO

| DATA STRUCTURE NAME | T1 | T2 | ··· | ~346 |
|---|---|---|---|---|
| DATA PAGE SIZE | 16KB | 8KB | ··· | ~702 |
| DATA PAGES | 61897 | 78783 | ··· | ~704 |
| CACHE QUANTITY | 1024 PAGES | 2048 PAGES | ··· | ~466 |

TABLE DATA SIZE INFO

| DATA STRUCTURE NAME | Ind1-1 | Ind2-1 | ... | 346 |
|---|---|---|---|---|
| CORR. TABLE NAME | T1 | T2 | ... | 712 |
| DATA PAGE SIZE | 8KB | 8KB | ... | 702 |
| DATA PAGES | 3782 | 6782 | ... | 704 |
| LeafNODE PAGES | 2898 | 4890 | ... | 714 |
| CACHE QUANTITY | 1452 PAGES | 2400 PAGES | ... | 466 |
| ATTRIBUTE TO SPEACH | ID1 (ID1,ID2) | ID2 | ... | 716 |
| EXPECTED TUPLES | 5.5 1 | 1 | ... | 718 |

B-Tree INDEX INFO 710

CASH QUANTITY INFORMATION

INFO, ACCESS DISTRIBUTION ACROSS TABLE PAGES

FIG.18

| PROCESS ID (432) | DATA STRUCTURE NAME (346) | EXPECTED DATA PAGES TO ACCESS (784) | |
| --- | --- | --- | --- |
| | | TOTAL | UPDATE |
| 1 | T1 | 9 | 6 |
| | Ind1-1 | 9 | 0 |
| | T2 | 1 | 1 |
| | ⋮ | ⋮ | ⋮ |
| 2 | T3 | 4 | 0 |
| | ⋮ | ⋮ | ⋮ |
| ⋮ | ⋮ | ⋮ | ⋮ |

INFO, EXPECTED DATA PAGES TO ACCESS (780)

FIG. 23

REAL MGT. SUBCACHE PARTITIONS:R — 502
VIRTUAL MGT. SUBCACHE PARTITIONS:V — 504

| LU ID | LU 0 | | LU 1 | | ... |
|---|---|---|---|---|---|
| I/O TYPE | Read | Write | Read | Write | ... |
| CUMULATIVE COUNT OF EXECUTION | 489789 | 78978 | 168799 | 789 | ... |
| CUMULATIVE COUNT OF CACHE HITS — TOTAL OF REAL HITS | 138978 | 78978 | 48958 | 789 | ... |
| 1ST PARTITION | 0 | — | 342 | — | ... |
| 2ND PARTITION | 2870 | — | 6869 | — | ... |
| ...... | ...... | ...... | ...... | ...... | ...... |
| (V+R)TH PARTITION | 7987 | — | 4789 | — | ... |

364, 366, 368, 370

CACHE MONITORED STATISTICS INFO — 362

FIG. 24

| DBMS RESOURCE NAME | Log Writer | Dic | Tbl1 | ... | ⎫ 412 |
|---|---|---|---|---|---|
| CUMULATIVE COUNT OF WAIT | 7809 | 36 | 0 | ... | ⎫ 414 |

DBMS MONITORED STATISTICS INFO
410

FIG. 25

| PROCESS ID | 1 | 2 | ... | ⎫ 432 |
|---|---|---|---|---|
| CUMULATIVE COUNT OF EXECUTION | 48978 | 7897 | ... | ⎫ 368 |
| CUMULATIVE PROCESS EXECUTION TIME | 102956 | 24637 | ... | ⎫ 396 |

ONLINE JOBS MONITORED STATISTICS INFO
430

FIG. 27

| MONITORED POINT ID | | Host0-Port0 | Host0-Port0 | ... | 514 |
|---|---|---|---|---|---|
| WHAT IS MONITORED | | CUMULATIVE COUNT OF EXECUTION | CUMULATIVE DATA AMOUNT TRANSFERRED | ... | 516 |
| LAST DATA COLLEC- TION INFO | TIME | '02/12/14 13:00:00 | '02/12/14 13:00:00 | | 518 |
| | COLLECTED DATA NUMBER | 7907209 | 50298237893 | | |
| HISTORY INFO | HISTORY DATA ITEM | AVG. IOPS | AVG. DATA AMOUNT TRANSFERRED (MBPS) | ... | 522 |
| | RECORD 0 PERIOD | '02/12/1 00:00:00~ 00:05:00 | '02/12/1 00:00:00~ 00:05:00 | ... | 524 |
| | RECORD 0 AVG. | 152 | 7.6 | ... | |
| | RECORD 0 MAX. | 203 | 10.2 | ... | |
| | RECORD 1 PERIOD | '02/12/1 00:05:00~ 00:10:00 | '02/12/1 00:05:00~ 00:10:00 | ... | 520 |
| | RECORD 1 AVG. | 189 | 9.5 | ... | |
| | RECORD 1 MAX. | 258 | 12.9 | ... | |
| | ⋮ | ⋮ | ⋮ | ⋮ | |

MONITORING HISTORY INFO — 510

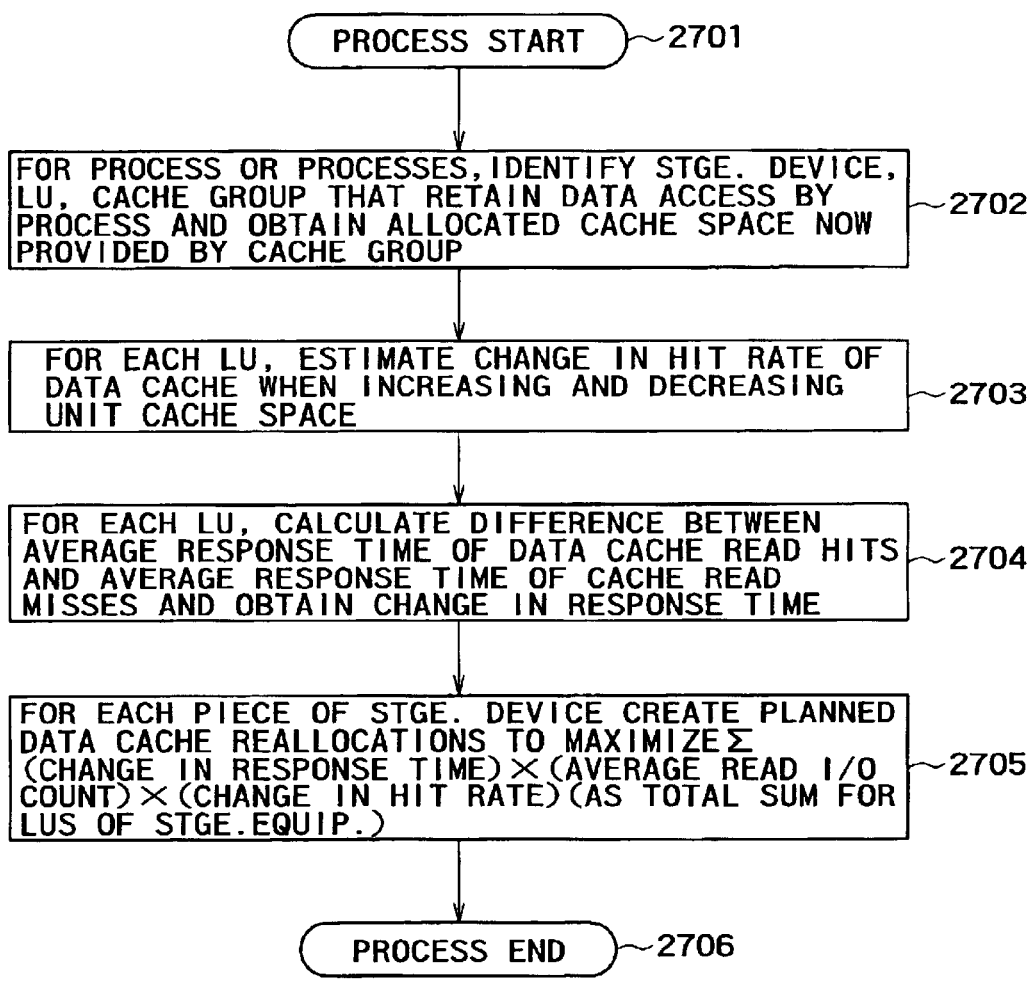

ns and achieving suchCACHE MANAGEMENT METHOD FOR
STORAGE DEVICE

BACKGROUND OF THE INVENTION

1. Field of the Invention

The present invention relates to a cache management method for a storage device and, more particularly, cache space setting and management for a storage device in a computer system in which database management systems (DBMSs) run.

2. Description of the Prior Art

Through analysis of software organization of application (AP) programs that are run on a server computer, it is evident that the majority of the AP programs use databases (DBs) as a basis of their operation and that database management systems (DBMSs) responsible for a sequence of processes and management of the DBs are very important.

Meanwhile, there are performance requirements defined per job type in using the AP programs and achieving such requirements is strongly required and hugely important in computer system management. DBMS performance greatly depends on data access performance. Accordingly, it is important to enhance the performance of access to the storage device.

In general, a storage device comprising a great number of disk storage units has a data cache which is fast accessible and in which data is temporarily stored within the storage device. When reading data, if the data resides in the cache (hit), the data is read from the cache. U.S. Pat. No. 5,434,992 (Document 1) discloses a technique for increasing the cache hit rate by partitioning a cache into subcaches for storing different data types and optimally allocating cache space to the subcaches. The system disclosed in the above document 1 carries out cache data replacement control, using a least recently used (LRU) cache replacement algorithm and obtains information for each cache hit about its approximate position of reference in an LRU management list. When reallocating cache space to the subcaches, the system estimates cache hit rates for the subcaches, using the above information, and thus optimizing the subcache partitions.

Generally, computers also have a cache in the form of a file cache or the like. Theodore M. Wong and John Wilkes (Document 2) discuss a technique for enhancing data access performance by exclusively using the file cache on a computer and the data cache on the storage device. This technique uses a mechanism in which data that has become uncached on the computer is cached on the storage device. The storage device principally performs cache data replacement control, according to the LRU cache replacement algorithm. However, the storage device inserts data read from a disk storage unit at the tail of LRU in the LRU management list and controls cached data so that the data does not remain in the data cache on the storage device. In order to further improve the cache hit rate, the above technique uses additional LRU management lists called ghost LRU caches which are separately provided for data read from disk storage units and data given from the computer, respectively. Using the ghosts, a method for optimizing the initial data insertion position in the overall cache management LRU list for each cache is also discussed.

Document 1: U.S. Pat. No. 5,434,992
Document 2:
Theodore M. Wong and John Wilkes, "My cache or yours? Making storage more exclusive", USENIX Annual Technical Conference (USENIX 2002), pp. 161–175, 10–15 Jun. 2002

In general, data that is managed by DBMSs is definitely classified into types, according to its content and purpose of use. Data types have different access patterns. For some data type, its access pattern required can be predefined. However, the prior art techniques for cache enhancement does not exactly consider such access patterns.

The technique of Document 1 partitions the cache into subcaches and allocates cache space to the subcaches for different data types and, therefore, enables caching adaptive to difference of data type specific access patterns, but does not take data and process specifics into consideration. The technique of Document 2 takes no consideration of the caching adaptive to the difference of data type specific access patterns.

SUMMARY OF THE INVENTION

It is an object of the present invention to enable optimum cache space settings in the storage device in a computer system where DBMSs run and reduce the performance management cost of such system.

It is another object of the present invention to make effective data cache allocations in the storage device, based on difference in access characteristics of data differentiated by the purpose of use of data and process details.

It is yet another object of the present invention to perform data cache space tuning, based on operating statistics information about access to the data cache, thus enhancing the cache effect.

The present invention obtains information about processes to be executed by a DBMS, which is provided as design information, and sets cache space available for each data, based on the design information.

In a preferable example, the present invention adjusts cache space to store logs output from the DBMS. The logs are information that the DBMS outputs when rebooting after its abnormal termination in order to rerun and undo the processes. In preparation for rerun and undo that should be performed quickly, cache space is allocated so that all logs to be used should reside on the cache and quick reading of the logs be performed. Log size to be read is determined, based on required rerun time (including redo time), and cache space is set allowing the log data of that size to reside on the cache.

The present invention also optimizes initial cache space allocations for table and index data. If a set of processes to be executed by the DBMS is defined, approximate access size to the whole range of a data set can be figured out through process analysis. In a preferable example, the invention gives approximate access characteristics across the data objects, determines an approximate cache hit rate when a certain amount of cache space is allocated to a data set, based on the access characteristics and the result of process analysis, and determines cache space to be allocated to the data set.

The present invention also can enhance the cache effect by cache space tuning in combination with operating statistics information. In a preferable example, the invention offers an optimum cache allocation method, based on estimates in change in process execution time when cache space is reconfigured for a process determined undesirable and all processes and such estimates are made by combining expected data pages to be accessed during processes obtained by pre-analysis and cache operating statistics information.

In the above-described invention, the cache of the storage device is partitioned into subcaches and separate subcache partitions are allocated for each data set in order to handle difference in access characteristics of different data sets.

BRIEF DESCRIPTION OF THE DRAWINGS

FIG. 5 illustrates a data structure example of data storage location information;

FIG. 6 illustrates a data structure example of attribute data size information;

FIG. 13 illustrates a data structure example of cache group information;

FIG. 14 illustrates a data structure example of table data size information;

FIG. 15 illustrates a data structure example of B-Tree index information;

FIG. 18 illustrates a data structure example of information, expected data pages to access;

FIG. 23 illustrates a data structure example of cache monitored statistics information;

FIG. 24 illustrates a data structure example of DBMS monitored statistics information;

FIG. 25 illustrates a data structure example of online jobs monitored statistics information;

FIG. 27 illustrates a data structure example of monitoring history information 5;

FIG. 29 shows the process flow of a procedure of tuning space allocations in the data cache, based on monitored statistics information.

DESCRIPTION OF PREFERRED EMBODIMENTS

Preferred embodiments of the present invention will be described hereinafter. These embodiments are examples and the reader should not construe these embodiments as limitations on the scope of the invention.

Embodiment 1

The cache management method according to a preferred Embodiment 1 of the invention is to adjust cache space for logs to be output from DBMSs, based on design information about processes to be executed by the DBMSs. Here, the processes are executed by the DBMSs. The design information is created by designing processes to be executed by the DBMSs to realize required functions. In the design phase, for example, SQL statements to express each individual process are created and one process is carried out by executing a plurality of SQL statements. The logs are information that a DBMS outputs when rebooting after its abnormal termination in order to rerun and undo the processes. In preparation for rerun and undo that should be performed quickly, cache space is allocated so that all logs to be used should reside on the cache and quick reading of the logs be performed. Log size to be read is determined, based on required rerun time (including redo time), and setting cache space allowing the log data of that size to reside on the cache is realized.

Figure 1:
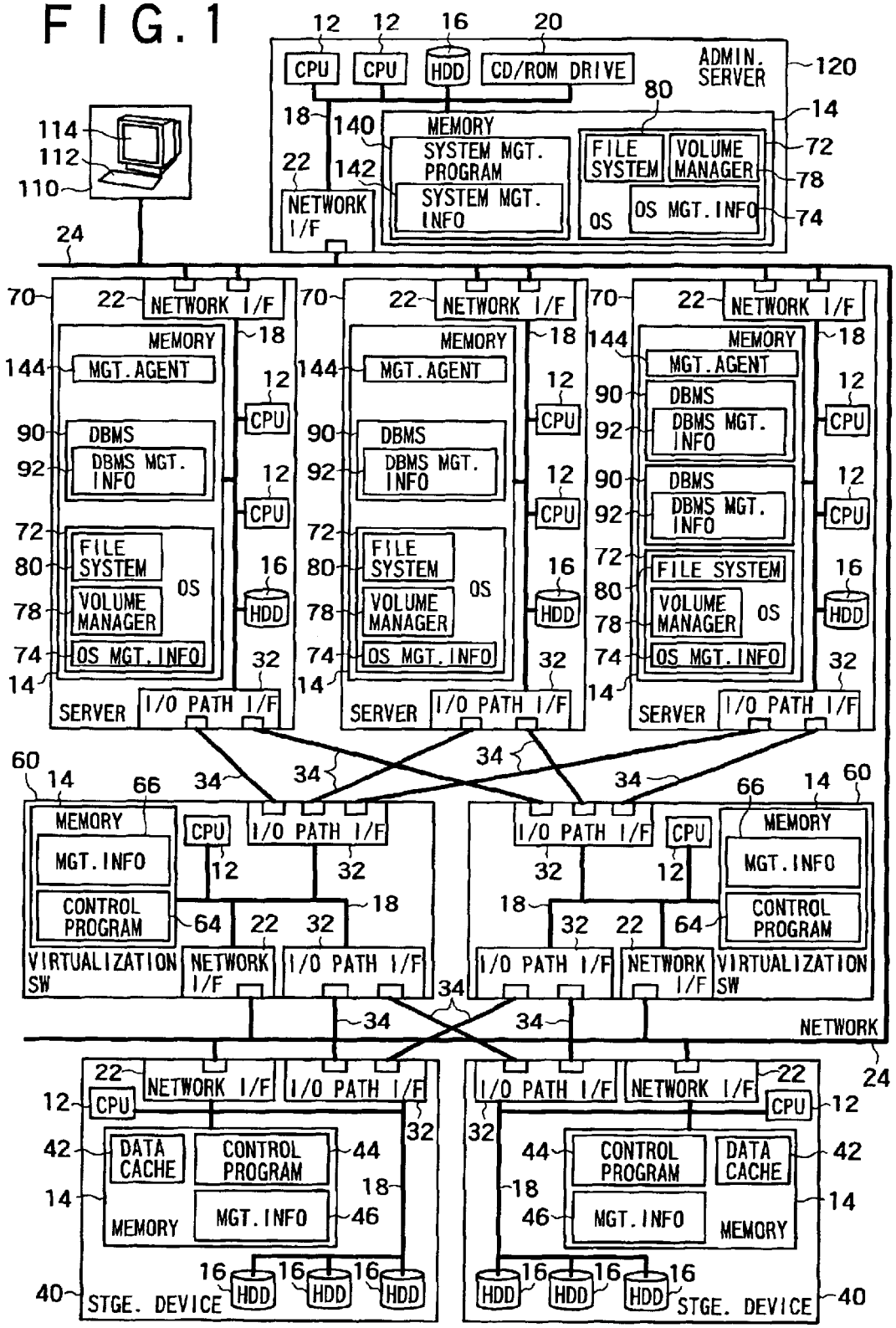
FIG. 1 shows a computer system configuration according to a preferred Embodiment 1 of the invention.

FIG. 1 is a diagram showing a computer system configuration according to Embodiment 1 of the present invention. The computer system is comprised of storage devices 40, computers (hereinafter referred to as "servers") 70 that are hosts to the storage devices 40, a computer (hereinafter referred to as an "administrative server") 120 which is responsible for system management, and virtualize switches 60 which virtualize storage space. These entities have network interfaces (which are abbreviated to network I/Fs) 22, and are connected to a network 24 through the network I/Fs 22 and intercommunicable.

The servers 70, virtualize switches 60, and storage devices 40 have I/O path I/Fs 32 and are connected to communication lines (hereinafter referred to "I/O paths") 34 through the I/O path I/Fs 32. I/O processing between the servers 70 and storage devices 40 is performed, using the I/O paths 34. For the I/O paths, different types of communication lines may be used to allow for data transfer even if different physical media and different protocols are used across the entities. Alternatively, the network and I/O paths may be same type of communication lines.

Each storage device 40 comprises a CPU 12, a memory 14, disk storage units (hereinafter referred to as "HDDs") 16, a network I/F 22, an I/O path I/F 32 which are connected by an internal bus 18. It is preferable to employ the HDDs 16, for example, those arranged in a RAID (Redundant Array of Inexpensive Disks). However, it is not necessarily employ the HDDs arranged in the RAID and a single HDD or a plurality of HDDs may be employed. The memory 14 comprises nonvolatile storage space and high performance storage space.

A control program 44 that controls the storage device 40 is stored in the nonvolatile storage space on the memory 14 and, when it is activated, the program is transferred to the high performance storage space on the memory 14 and then executed by the CPU 12. All functions that the storage device 40 has are implemented under the control of by the control program 44. Management information 46 that the control program 44 uses to control and manage the storage device 40 is also stored on the memory 14. Moreover, a portion of the memory 14 is allocated to a data cache 42 that provides for space to temporarily store data for which access is requested from an external entity.

The storage device 40 virtualizes the physical storage spaces of the HDDs 16 into one or a plurality of logical disk storage units (hereinafter referred to as "LUs") 208 (see FIG. 2 for details) which are provided to external entities. The LUs 208 may one-to-one correspond to the HDDs 16 or may correspond to a storage space consisting of a plurality of HDDs 16. One HDD 16 may correspond to a plurality of LUs 208. Corresponding relationships between LUs and HDDs are retained in the form of space mapping information 300 included in the management information 46.

In the storage device 40, the storage space is divided into groups in units of the LUs 208 and separate space partitions within the data cache 42 are allocated to the groups. Hereinafter, these groups of the LUs 208 are called "cache groups." The organization of the cache groups is retained in the form of cache group information 460 included in the management information 46. Creating and deleting a cache group and adding and deleting an LU 208 to/from a cache group can be performed dynamically (dynamically configuring cache groups is applied hereinafter in such a way "to be performed without stopping another process being executed"). The storage device also has a function of dynamically changing the space allocations of the data cache 42 to the cache groups.

The storage device 40 has a function of sending the space mapping information (see FIG. 3 for details), cache group information 460 (see FIG. 4 for details), and other configuration information on the storage device 40 to an external entity via the network 24 in response to request from the external entity. Also, the storage device 40 has a function of executing the above-mentioned functions, following a directive received from an external entity via the network 24.

Each virtualize switch 60 comprises a CPU 12, a memory 14, a network I/F 22, and I/O path I/Fs 32 which are connected by its internal bus 18. The memory 14 comprises nonvolatile storage space and high performance storage space.

A control program 64 that controls the virtualize switch 60 is stored in the nonvolatile storage space on the memory 14 and, when it is activated, the program is transferred to the high performance storage space on the memory 14 and then executed by the CPU 12. All functions that the virtualize switch 60 provides are controlled by the control program 64. Management information 66 that the control program 64 uses to control and manage the virtualize switch 60 is also stored on the memory 14.

The virtualize switch 60 recognizes an LU 208 provided from the storage device 40 connected thereto and virtualizes the LU storage space into a virtual volume 206 which is provided to an external entity (e.g., a server 70 and another virtualize switch 60). If multiple virtualize switches 60 are connected, the virtualize switch 60 handles a virtual volume 206 provided from another virtualize switch 60 the same as an LU 208 provided from the storage device 40 and virtualizes its storage space into a virtual volume 206 which is provided to an external entity. Corresponding relationships between logical units and virtual volumes are retained in the form of the space mapping information 300 included in the management information 66. The virtualize switch 60 has a function of sending the space mapping information 300 and other configuration information to an external entity via the network 24 in response to request from the external entity.

Each server 70 comprises CPUs 12, a memory 14, an HDD 16, a network I/F 22, and an I/O path I/F 32 which are connected its internal bus 18. On the memory 14, there reside an operating system (OS) 72 and a management agent 144 which are read from the HDD 16 and executed by the CPUs 12.

The OS 72 is a suit of programs which provide basic processing functions to a program running on the server 70; e.g., controlling hardware such as the network I/F 22 and the I/O path I/F 32, communication with another entity via the network 24, data transfer processing through the I/O paths, and controlling execution across a plurality of programs. The OS 72 includes a volume manager 78 and a file system 80. The OS 72 which has been read to the memory 14 has OS management information 74 which is used by the programs constituting the OS and programs constituting another OS 72. The OS management information 74 includes hardware configuration information on the server 70. The OS 72 has a software interface allowing an external program to read information stored in the OS management information 74 part. While the server 70 has only the one file system 80 as shown in FIG. 1, the server may have a plurality of file systems 80.

The volume manager 78 is a program which virtualizes the storage space of an LU 208 provided from the storage device 40 and a virtual volume 206 provided from the virtualize switch 60 into a logical volume 204 and provides the logical volume 204 to the file system 80. Corresponding relationships between LUs/virtual volumes and logical volumes are retained in the form of the space mapping information 300 included in the OS management information 74. Also, the volume manager 78 may include a load balancing function for I/O processing, using a plurality of I/O paths 34.

The file system 80 is a program which virtualizes the storage space of an LU 208 provided from the storage device 40, a virtual volume 206 provided from the virtualize switch 60, and a logical volume 204 provided from the volume manager 78 into a file 202 and provides the file 202 to another program. Corresponding relationships between LUs/virtual volumes/logical volumes and files are retained in the form of the space mapping information 300 included in the OS management information 74. The file system 80 also provides a raw device function which provides direct access to the storage space of a logic volume 204, virtual volume 206, and LU 208 as a software interface akin to files 202.

The management agent 144 is a program which performs processing as requested by a process request received from a system management program 140 on the administrative server 120 via the network 24 and returns the result of the execution of the processing, if necessary, to the system management program 140 via the network 24. Processing that is performed by the management agent 144 includes: (1) reading information stored in the OS management information 74 part; and (2) reading information stored in the DBMS management information 92 part.

A DBMS 90 is a program which is executed on the server 70 to perform a sequence of DB-related processes and management. This program is read from the HDD 16 or storage device 40 to the memory 14 and executed by the CPU 12. The DBMS 90 that has been read to the memory 14 has DBMS management information 92 which is management information for the DBMS 90 and includes data storage location information 342 which is information about storage locations of tables, indexes, logs, etc. (hereinafter referred to as "data structures" collectively) which the DBMS uses and manages. The DBMS 90 has a software interface allowing an external program to read the DBMS management information 92. A plurality of DBMSs 90 can be executed on a single server 70.

The OS 72, DBMS 90, and management agent 144 programs are stored on CD-ROMs (storage media). The contents of the CD-ROMs are read by a CD-ROM drive 20 on the administrative server 120, transmitted over the network 24, and installed into the HDD 16 or storage device 40.

The administrative server 12 comprises a CPU 12, a memory 14, an HDD 16, the CD-ROM drive 20, and a network I/F 22 which are connected by its internal bus 18.

The OS 72 and system management program 140 are read from the HDD 16 to the memory 14 and executed by the CPU 12. The CD-ROM drive 20 is used to install programs of several types.

To the administrative server 120, an administrative terminal 110 which has input devices 112 such as keyboards and mice and a display screen 114 is connected via the network 24. This connection may be made by a communication line different from the network 24 or the administrative server and the administrative server 110 may be united into a single entity. An administrator ordinarily enters information and obtains outputs through the administrative terminal 110 and may use the CD-ROM drive 20 when necessary.

The system management program 140 is a program which implements system management functions that the administrative server 120 has. This program is read from the HDD 16 to the memory 14 and executed by the CPU 12. The system management program 140 has system management information 142 which is required to implement its functions. This program is stored on a CD-ROM and its contents are read by the CD-ROM drive 20 of the administrative server 120 and installed into the HDD 16.

The system management program 140 obtains various kinds of information from another entity. As regards information held on the storage devices 40 and virtualize switches 60, the system management program 140 issues a solicit request for information directly to the appropriate entity via the network 24 and obtains the information. As regards information held within a program that is executed on the server 70, the system management program 140 issues a request to read information to the management agent 144 via the network 24 and collects the target information that the management agent 144 reads.

The system management program 140 obtains space mapping information 300 held on the appropriate storage device 40, virtualize switch 60, volume manager 78, and file system 80 (hereinafter, these entities are referred to as "virtualize facilities" collectively), data storage location information 342 from the DBMS 90, and cache group information 460 from the storage device 40, and stores the thus obtained information with the identifiers of the sources from which the information was obtained into the system management information 142 part.

In management of cache groups on the storage device 40, the system management program 140 handles a particular cache group as a "free cache group" for which cache allocations should be reduced first when adjusting cache allocations. Especially, an LU 208 for which cache space allocation is not requested is controlled as the one that belongs to the free cache group.

While the system management program 140 is executed on the administrative server 120 as shown in FIG. 1, this program may be executed on any server 70, virtualize switch 60, or storage device 40. If it is executed on the server 70, the system management program 140 is stored in the HDD 16, read to the memory 14, and then executed by the CPU 12. If it is executed on the virtualize switch 60 or storage device 40, the system management program 140 is stored in the nonvolatile storage space on the memory 14, transferred to the high performance storage space on the memory 14, and then executed by the CPU 12.

Figure 2:
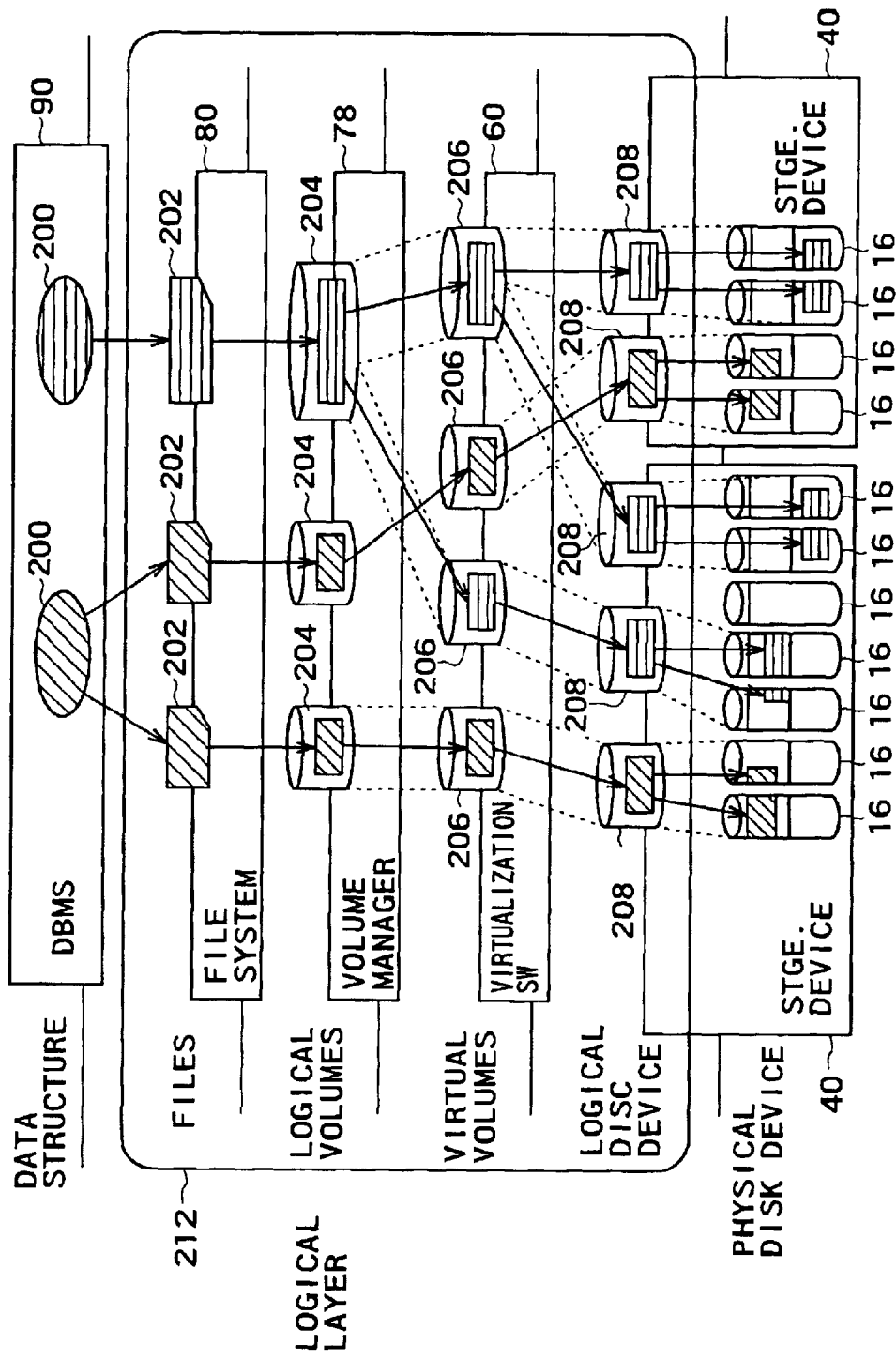
FIG. 2 shows a conceptual diagram of a hierarchical structure of data mapping in Embodiment 1.

FIG. 2 is a diagram showing a hierarchical structure of data mapping for data that the DBMS 90 manages in Embodiment 1.

Referring to FIG. 2, data mapping will be explained on the assumption that one virtualize switch 60 exists between a server 70 and storage device 40. Hereinafter, for two data hierarchies, one that is nearer to the DBMS 90 is referred to as "upper" and the other that is nearer to the HDD 16 is referred to as a "lower" hierarchy. Files 202, logical volumes 204, and LUs 208 are referred to as "virtual structures" collectively and the virtual structures plus HDDs 16 are referred to as "managerial structures" collectively.

In FIG. 2, the DBMS 90 is accessing a file 202 provided by the file system that stores data structures 200 that the DBMS 90 manages. The file system 80 converts the access to the file 202 to access to corresponding logical volume 204 space. The volume manager 78 converts the access to the logical volume 204 to access to corresponding virtual volume 206 space. The virtualize switch 60 converts the access to the virtual volume 206 to access to corresponding LU 208 space. The storage device 40 converts the access to the LU 208 to access to corresponding HDDs 16. In this manner, the virtualize facilities map virtual structure data which is provided to an upper hierarchy to one or more managerial structures existing in a lower hierarchy.

A same portion of data of a virtual structure may be mapped to a plurality of managerial structures of lower hierarchy, though this is not shown. There may be a plurality of paths through which data of a virtual structure is mapped to HDDs 16. In these cases, the virtualize facilities hold such mapping in the space mapping information 300.

A managerial structure may be mapped such that it is shared across a plurality of servers 70. This is used for servers 70 in a failover arrangement and DBMSs 90 which run on the servers 70.

In this embodiment, it is sufficient that corresponding relationships between managerial structures data in the logical layer 212 are clearly defined and the volume manger 78 may not be used on the server 70. There may be a plurality of virtualize switches 60. It may also possible that the virtualize switch 60 does not exist and the server 70 and the storage device 40 are directly connected by an I/O path 34. It may also possible that a switch equivalent to the virtualize switch 60 does not provide the virtualize function. In such cases, it is supposed that a managerial structure provided from the lower hierarchy to the virtualize switch 60 is provided to the upper hierarchy as is as a virtual structure. The effect of adjusting cache space in the storage device 40, which will be described later, can be enhanced by creating mapping so that only a single data structure 208 is stored in a single LU 208, thus avoiding that different data sets coexist in a same cache group, though it is not necessarily to do so.

Data structures that the hardware entities and programs hold will be described hereinafter.

Figure 3:
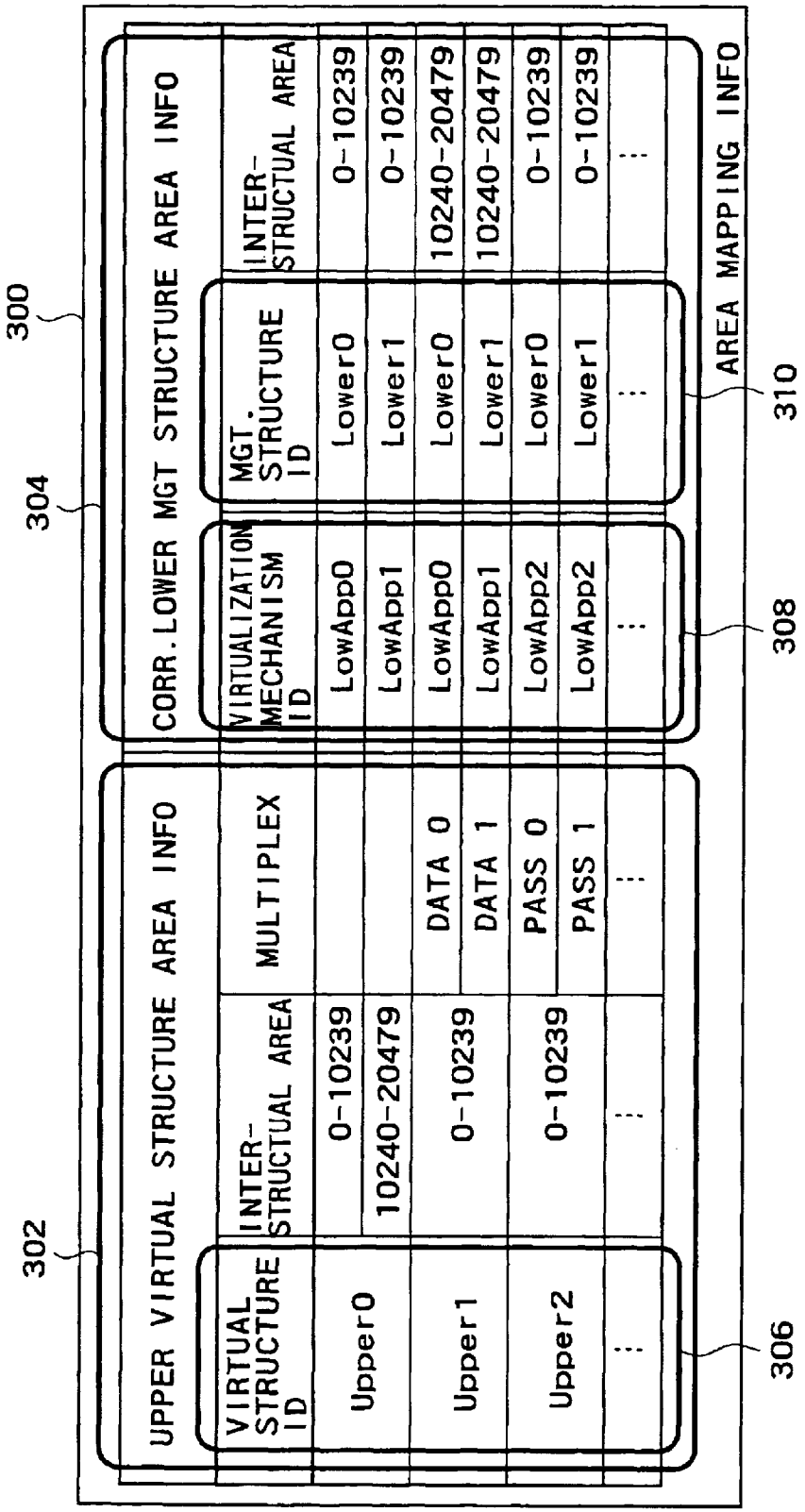
FIG. 3 illustrates a data structure example of space mapping information 300.

FIG. 3 illustrates a data structure example of space mapping information 300. The space mapping information 300 list holds the mappings between the spaces of virtual structures provided by the virtualize facilities and the spaces of managerial structures which the virtualize facilities use and comprises entry blocks 302 and 304. The entry block 302 contains information about the spaces of virtual structures which the virtualize facilities provide to the upper hierarchy and comprises the following entries in a set: an entry to hold virtual structure ID 306 which is the identifier of a virtual structure, an entry to specify space in the structure, and an entry to indicate multiplexing, that is, to specify storage space mapped to a plurality of virtual structures of lower hierarchy or different paths to HDDs 16 to which the storage space is mapped. The entry block 304 contains information about the managerial structures of lower hierarchy corresponding to the entries in the entry block 302 and comprises the following entries in a set: an entry to hold virtualize facility ID 308 which is the identifier of a virtualize facility that provides a managerial structure, an entry to hold managerial structure ID 310 which is the identifier of the managerial structure, and an entry to specify space in the structure. On the storage device 40, this list does not include the virtualize facility ID 308 entry column.

As described above, different virtual structures may be mapped to same managerial structure storage space. The virtualize facility ID 308, virtualize structure ID 306, and managerial structure ID 310 must be unique within the system. Even if such an identifier is not unique within the system, it can be made unique by adding the hardware entity identifier associated with it.

Figure 4:
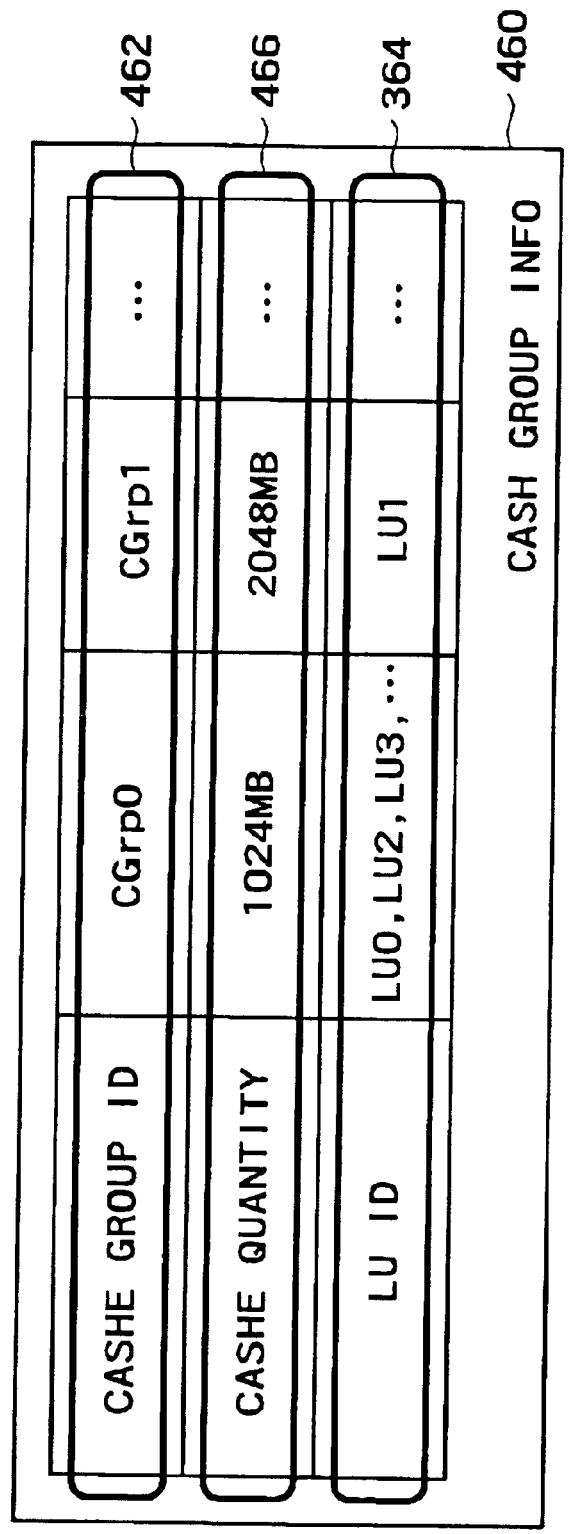
FIG. 4 illustrates a data structure example of cache group information.

FIG. 4 illustrates a data structure example of cache group information 460. The cache group information 460 list contains information to be used for the storage device 40 to manage cache groups and comprises the following entries in a set: an entry to hold cache group ID 462 which is the identifier of a cache group, an entry to hold cache space 466 which specifies the cache space allocated to the cache group, and an entry to hold LU ID 364, the identifier(s) of the LU(s) 208 belonging to the cache group.

FIG. 5 illustrates a data structure example of data storage location information 342. The data storage location information 342 list contains information to be used for managing the storage locations of data that the DBMS 90 manages and comprises the following entries in a set: an entry to hold data structure name 346 which is the name of a data structure and an entry to hold data storage location 348 which specifies where the data structure is stored in a file 202. The data structure name 346 must be unique within the DBMS 90. If a same name is allowable if used in different DBs within the DBMS, data structure names with a DB identifier are used.

In Embodiment 1, the DBMS 90 has attribute data size information 350 for table data structures as the information about the maximum data size of the attributes of a table to be stored in the DBMS management information 92 part.

FIG. 6 illustrates a data structure example of attribute data size information 350. The attribute data size information 350 list comprises the following entries in a set: an entry to hold data structure name 346 which is the name of a table, an entry to hold attribute name 352 which specifies the names of the attributes of the table, and an entry to hold maximum size 354 which specifies the maximum storage space f or the attribute entry.

Figure 7:
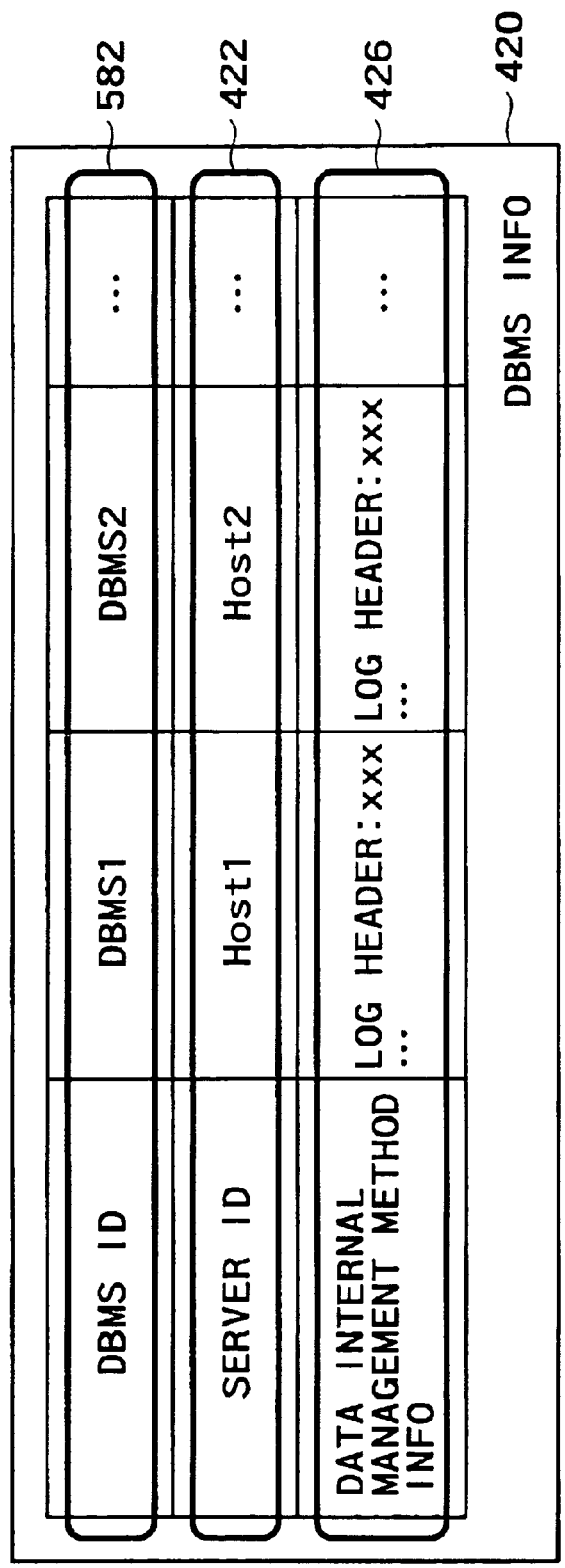
FIG. 7 illustrates a data structure example of DBMS information.

FIG. 7 illustrates a data structure example of DBMS information 420.

The system management program 140 holds information about the DBMSs 90 which run within the computer system as DBMS information 420 in the system management information 142 part. The DBMS information list comprises the following entries in a set: an entry to hold DBMS ID 582 which is the identifier of a DBMS 90, an entry to hold server ID 422 which is the identifier of a server 70 on which the DBMS runs, and an entry to hold data internal management method information 426 for the DBMS 90. The data internal management method information 426 comprises information about a log output format which is determined by the type of the DBMS 90.

A procedure of determining cache space to be allocated to logs with regard to the data cache 43 of the storage device 40 in Embodiment 1 will be described hereinafter. The system management program 140 carries out this procedure.

Figure 8:
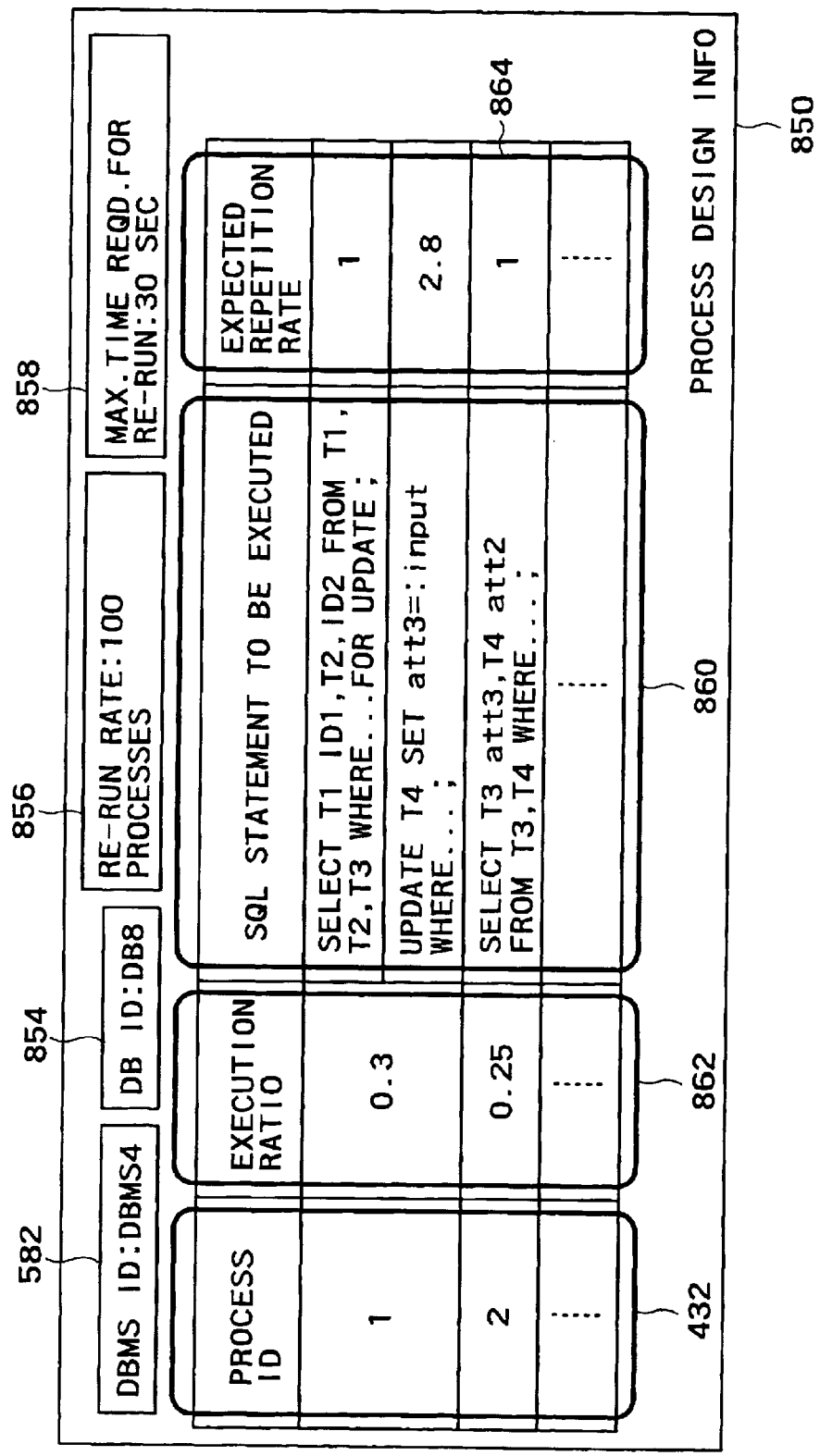
FIG. 8 illustrates a data structure example of process design information.

FIG. 8 illustrates a data structure example of process design information 850 which is supplied to the system management program 140 prior to the start of the above procedure. The process design information 850 list comprises an entry to hold DBMS ID 582 which is the identifier of a DBMS 90 that executes processes, an entry to hold DB ID 854 which is the identifier of a DB for which the processes are executed, an entry to hold rerun rate 856 which is information about the performance of rerun/undo processing using logs, and an entry to hold the maximum time required for rerun 858 which is the designed maximum time required to execute rerun/undo processing. For information about the processes to be executed, the list further comprises the following entries in a set: an entry to hold process ID 432 which is the identifier of a process, an entry to hold execution ratio 862 which specifies the ratio of the process to be executed, an entry to hold SQL statement to be executed 860 which specifies SQL statement(s) to be executed in the process, and an entry to hold expected repetition rate 864 which specifies the expected number of times the SQL statement(s) is executed in the process.

In Embodiment 1, the rerun rate 856 specifies the number of processes stored as logs that can be executed per unit time during a rerun and a measured value obtained during the system operation, a logical value obtained from the server 70 performance and the DBMS 90 logical processing performance, or a designed value determined during the system design phase is assigned to the rerun rate. A plurality of SQL statements may be executed in a single process and a plurality of SQL statements to be executed 860 may be specified for one process ID 432. If the SQL statements to be executed 860 are executed repeatedly, separate count values of the expected repetition rate 864 should be assigned. Even for the SQL statements included in a same process, the SQL statements to be executed may differ by different conditions and different values of the repetition rate can be assumed per SQL statement to be executed 860. The execution ratio 862 and expected repetition rate 864 to be assigned may be either designed values or measured values.

Figure 9:
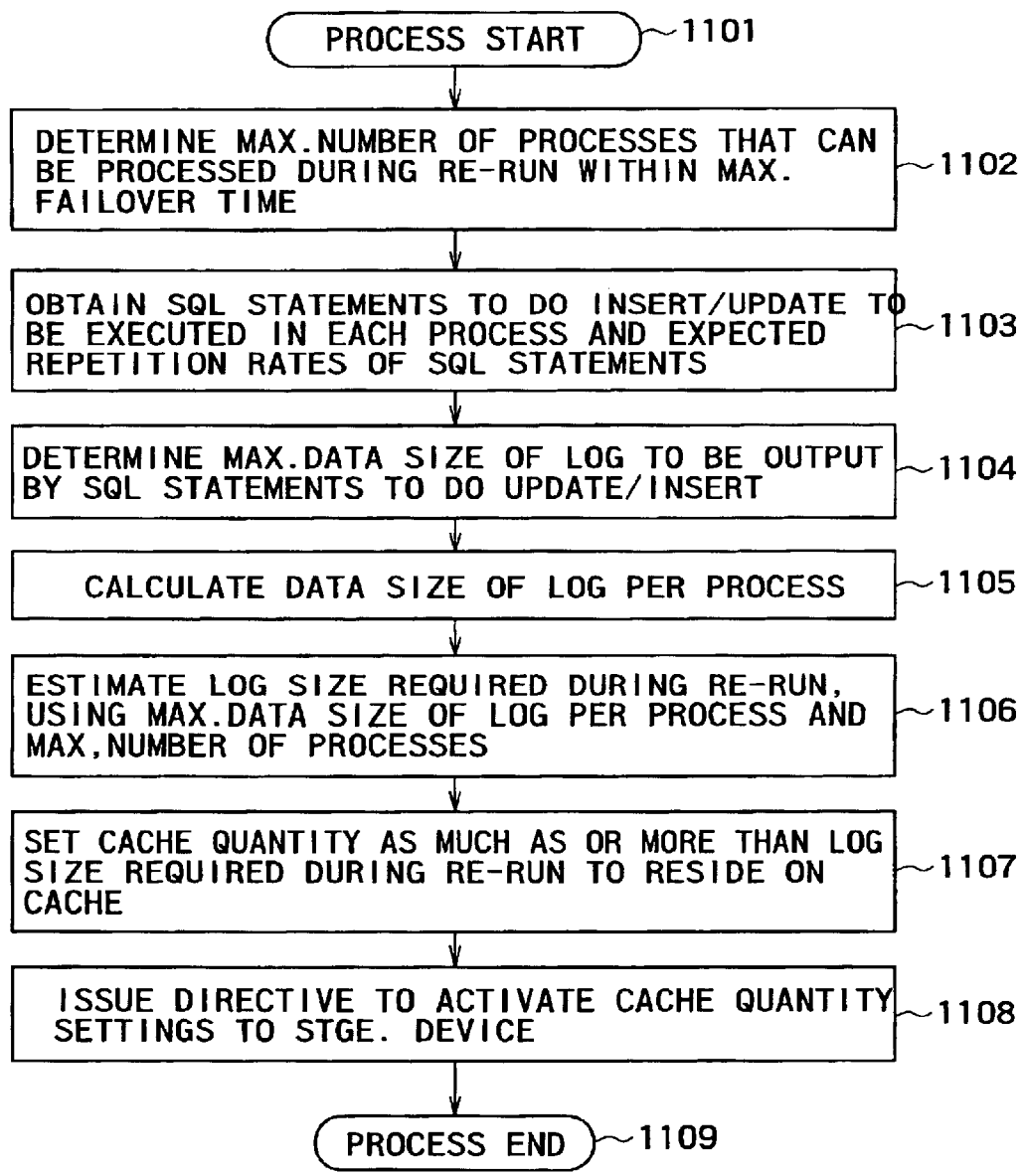
FIG. 9 shows a process flow of processing for setting cache space.

FIG. 9 is the process flow of a procedure for setting cache space to serve the needs of logs. As mentioned above, prior to the start of the procedure, the process design information 850 is supplied. The description of this process flow assumes that the DB and its storage space to be used to execute the processes have been defined in advance. However, in the absence of the information to be obtained from the DBMS 90 and virtualize facilities involved, the administrator should supply such information as design information separately and this procedure can be performed. (Step 1101)

Referring to the process design information 850, determine the maximum number of processes that can be executed during a rerun from the rerun rate 856 and the maximum time required for rerun 858. (Step 1102)

Referring to the SQL statements to be executed 860 in the process design information 850, obtain the SQL statements to do INSERT/UPDATE and the expected repetition rates 864 of the SQL statements. (Step 1103)

Determine the maximum data size of a log to be output by executing once each of the SQL statements 860 to do INSERT/UPDATE obtained in step 1103. First, identify the names of tables and attributes thereof for which data insertion and update is performed from the code of the target SQL statement 860. Then, refer to the attribute data size information 350 and obtain the maximum sizes 354 of the attributes. Also, obtain log output format information from the data internal management method information 426 in the DBMS information 420 list. From the thus obtained information, determine the maximum data size to be output as a log by executing each of the above SQL statements 860. (Step 1104)

Calculate output log size per process which outputs a log, using the values obtained in step 1103 and step 1104. This value is obtained as the sum of the products obtained by multiplying the maximum data size of the log from each SQL statement 860 to do INSERT/UPDATE included in a process by the expected repetition rate 864 specified for the SQL statement. Furthermore, from the data internal management method information 426 in the DBMS information 420 list, obtain information about the output format such as the log header and data to be output when the process is committed and add the data size for the header and commit to the output log size. Finally, round up the thus obtained output log size, based on units of block size (512 bytes). (Step 1105)

From the output log size per process which outputs a log obtained in step 1105 and the execution ratio 862 for each process in the process design information 850 list, calculate average output log size per process which outputs a log. Then, multiply the average output log size by the maximum number of processes that can be executed during a rerun obtained in step 1102 and add a predetermined margin to the thus obtained product, thereby determine the log size required during a rerun (step 1106).

Set cache space so that the log of the size obtained in step 1106 always reside on the storage device 40. From the mapping aggregate information, identify which storage device to which the log of the DBMS should be stored, which LU(s) 208 to which the log should be stored, and which cache group includes the LU(s) 208. Allocate cache space as much as or more than the log size required during a rerun, obtained in step 1105, to the thus identified cache group. If the storage device 40 duplicates written data, reserve cache space twice as much as the log size as required.

If the LU(s) 208 to which the log should be stored belongs to a free cache group, define a cache group consisting of the LU(s) only and allocate cache space as much as or more than the log size required during a rerun to the cache group. If the log is divided into sublogs and the sublogs are stored to a plurality of LUs 208 and belong to different cache groups, allocate cache space as much as or more than the sublog size required during a rerun to each cache group. If the mapping aggregate information gives mapping in which other data is also stored to the cache group to which the LU(s) 208 to which the log should be stored belongs, obtain the cache space allocated for the other data separately, for example, from the previous cache space settings of the cache group and add the above cache space now allocated to the thus obtained cache space, thereby updating the cache space of the cache group. (Step 1107)

Issue a directive to activate the cache group and its cache space settings determined in step 1106 to the storage device 40. If a DB to be used for caching is not yet defined within the DBMS 90, define the DB and reserve storage space and then carry out this step. (Step 1108)

Then, the procedure terminates. (Step 1109)

In the cache management method of Embodiment 1 described hereinbefore, it is assumed that the storage device 40 provides LUs 208 to external entities and the LUs are accessed via the I/O paths 34. However, in some implementation, it may also preferable that the storage device 40 provides files 202 to external entities and the files 202 are accessed via the network 24 through the use of network file system protocols.

Figure 10:
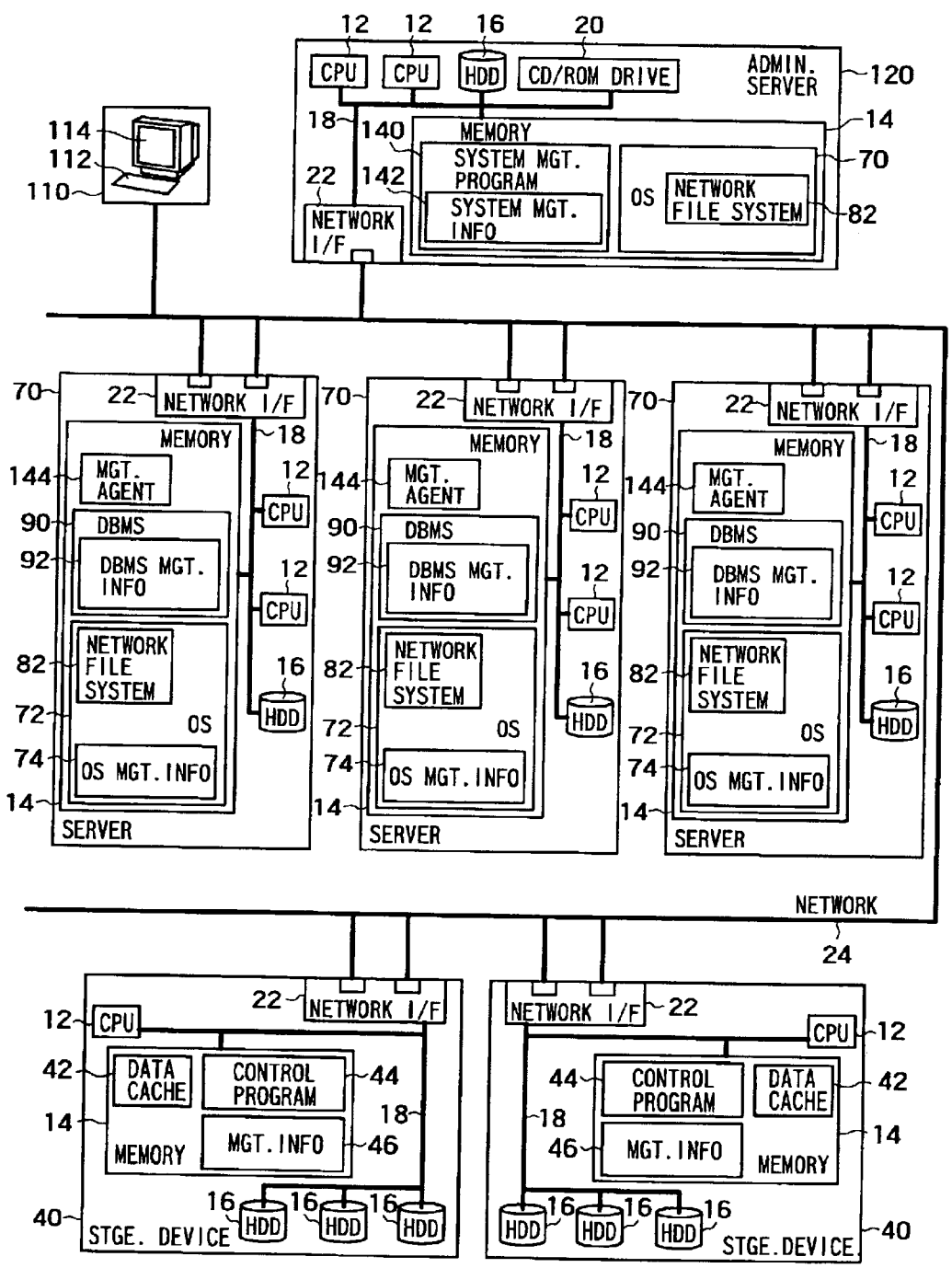
FIG. 10 shows a computer system configuration for explaining an example of modification to the system of Embodiment 1.

FIG. 10 is a diagram showing a computer system configuration where the storage device 40 provides files 202 to external entities, as an example of modification to the foregoing system of Embodiment 1. This modified system differs from the system of Embodiment 1 in the following respects.

The servers 70 need not have the I/O path I/Fs 32. The OS 72 includes a network file system 82 which allows access to the files 202 provided by external entities through the network I/Fs 22 and the network 24, using network file system protocols, and need not have the volume manager 78 and file system 80. The network file system has the space mapping information 300 in the OS management information 74 part. If correspondence between a file recognized by the DBMS 90 and a file provided from the storage device 40 is determined, according to certain rules, only the information about the rules to determine the corresponding relationships may be retained in the OS management information 74 part. In this case, the system management program 140 obtains the information to determine the corresponding relationships and, from this information, creates space mapping information 300 and stores the thus created mapping into the mapping aggregate information part.

The storage devices 40 need not have the I/O path I/Fs 32 and provide files to external entities. The control program 44 of the storage device 40 has the same functions that the file system 80 provides, virtualizes the storage spaces of LUs 208 existing in the storage device 40 into files 202 and provides the files 202. The control program 44 interprets one or more network file system protocols and carries out processing file access requested from an external entity through the network 24 and network I/Fs 22, using the protocols. In the case of this storage device 40, cache group members are managed in units of files 202 instead of LUs 208.

As for data mapping, in the data mapping hierarchical structure described in FIG. 2, all the files 202 and lower hierarchies are provided by the storage device 40 in this modified system, and the servers 70 get access to the files existing on the storage device 40, using the network file system 82 within the OS 72.

In the case where the storage device 40 provides files 202 to external entities, in the above-described procedure to be carried out in Embodiment 1, replace the LU(s) 208 by file(s) 202 on the storage device 40.

Embodiment 2

The cache management method according to a preferred Embodiment 2 of the invention is to optimize initial cache space allocations for table and index data, based on design information about processes to be executed by the DBMSs. If a set of processes to be executed by the DBMSs is defined, approximate access size to the whole range of a data set can be figured out through process analysis. For each data set, the cache management method of Embodiment 2 essentially comprises giving approximate access characteristics across the data objects, determining an approximate cache hit rate when a certain amount of cache space is allocated to the data set, based on the access characteristics and the result of process analysis, and determining cache space to be allocated to the data set. Embodiment 2 assumes that the computer system includes cache management facilities which regard a pair of the cache of a DBMS and the data cache of a storage device as a single total cache area and there occurs almost no duplication of data to be stored to both caches.

Figure 11:
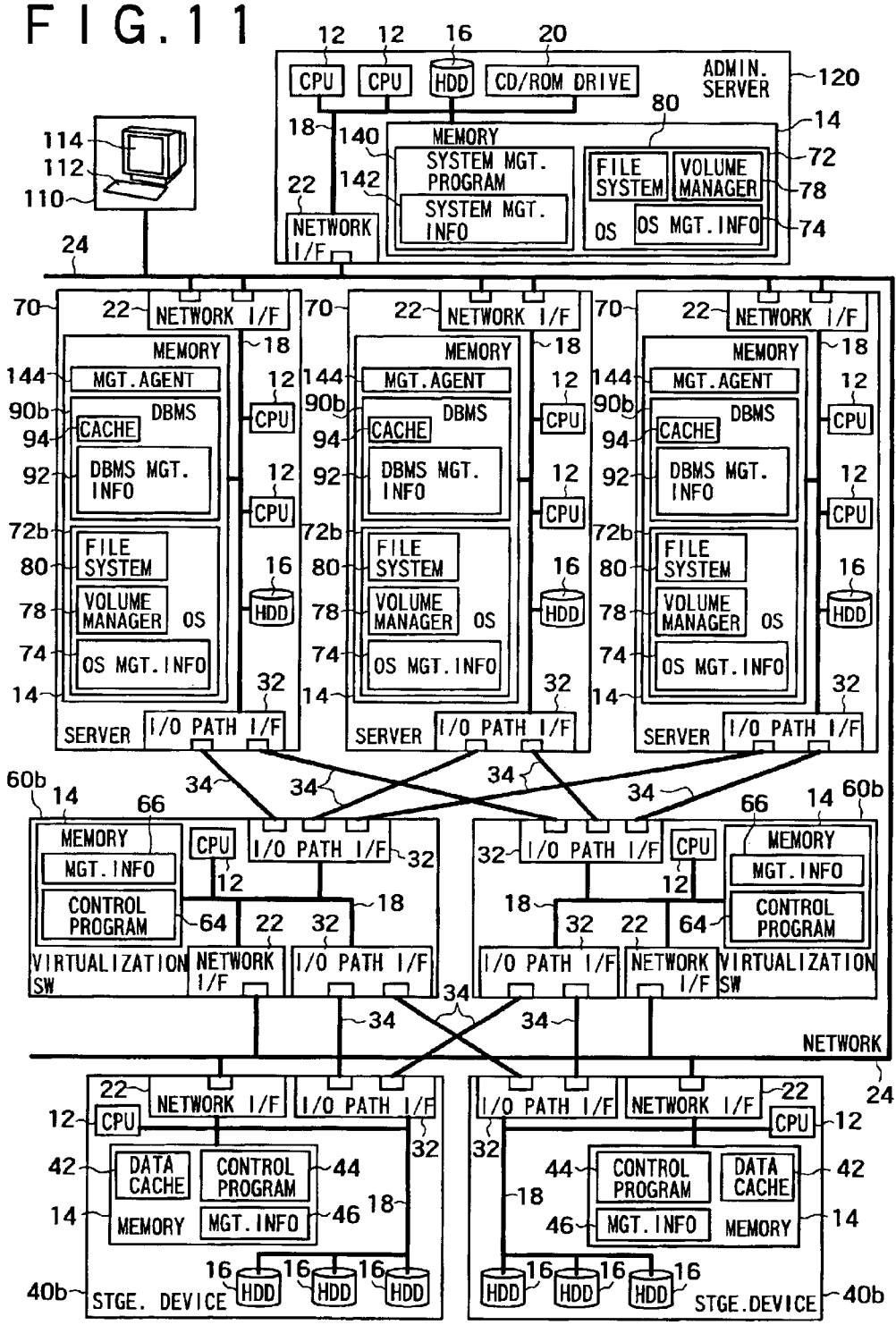
FIG. 11 shows a computer system configuration according to a preferred Embodiment 2 of the invention.

FIG. 11 is a diagram showing a computer system configuration according to Embodiment 2 of the invention. The computer system configuration of Embodiment 1 is fundamentally the same as that of Embodiment 2. The system of Embodiment 2 will be described below, focusing on the difference from the system of Embodiment 1.

A DBMS 90b which replaces the DBMS 90 uses an area on the memory 14 as a cache 94 and includes table data size information 700 and B-Tree index information 710 in the DBMS management information 92 part. The DBMS 90b need not hold the attribute data size information 350. The DBMS 90b includes a function of managing cache space to be used per data structure in the cache 94 and cache space settings information is included in the table data size information 700 and B-Tree index information 710. The DBMS 90b has a software interface for dynamically changing cache space to be used per data structure in the cache 94.

To the process objects to be performed by the management agent 144 under the instructions of the system management program 140, directing the DBMS 90b to change cache space to be used per data structure in the cache 94 is added. The system management program 140 need not have the data internal management method information 426 in the DBMS information 420 part retained in the system management information 142 part.

A further great difference is that a caching request 954 and a write request with caching request 958 are transmitted through an I/O path 34. Th caching request 954 requests the storage device 40b to cache data stored therein to the data cache 42 and data to be cached is specified in this request in the same format as in a read request 950 which is commonly used. The write request with caching request 958 requests the storage device 40b to cache data which has just been written to the storage to the data cache 42 also.

Examples of use of the caching request 954 and write request with caching request 958 which are transferred through an I/O path 34, using a data transfer protocol, based on a SCSI (Small Computer System Interface) will be described. As a first method, create new operation codes corresponding to the caching request 954 and write request with caching request 958. As a second method which uses existing prefetch and write operation codes, define a bit that represents cache hint, using a vendor-dependent bit of a control byte in a command, and set the bit as follows. When its value is "0," a normally defined action is performed. When its value is "1" and if the operation code is a prefetch command, an action of caching request 954 is performed; if the operation code is writing, an action of write request with caching request 958 is performed. Other data transfer protocols may be used to realize the operation in which the caching request 954 and write request with caching request 958 could be performed in the same manner.

In Embodiment 2, a virtualize switch 60b which replaces the virtualize switch 60 realizes a function of converting a caching request 954 and a write request with caching request 958 to a virtual volume 206 to the caching request 954 and the write request with caching request 958 to the corresponding managerial structure under the control program 64. The OS 72 on each server 70 is replaced by an OS 72b which can transmit a caching request 954 and a write request with caching request 958 passed from a host program through an I/O path 34. The DBMS 90b has a function of transmitting a caching request 954 and a write request with caching request 958. The storage devices 40 are replaced by storage devices 40b which can interpret, under the control program 44, the caching request 954 and write request with caching request 958.

In Embodiment 2, the cache group information 460 held on the storage device 40 is replaced by cache group information 460b on the storage device 40b. When the storage device 40b receives a caching request 954 or write request with caching request 958 for data stored on an LU 208 belonging to a cache group for which hint function 468 is "ON" in the cache group information 460b, the storage device caches the data specified by the request so as to retain it on the data cache 42 for a long period. For example, if the storage device 40b manages the data areas of the cache groups, using the LRU cache replacement algorithm, it counts data, when the data is requested, as MRU (most recently used) data. When the storage device 40b receives a caching request 954, if the data specified by the request does not exist on the data cache 42, the storage device reads the data from an HDD 16 and caches it to the data cache 42. When receiving a read request 950 or write request 956 to the LU 208, the storage device 40b, after completing the request, in principle, does not retain the data on the data cache 42. The storage device 40b clears cached data from the cache area as soon as the data no longer needs to be retained to make the area available for reuse immediately, even if it is preferable for internal control to retain the data on the data cache 42 for internal control need (in the foregoing example, the data is handled as LUR data at that time).

Figure 12:
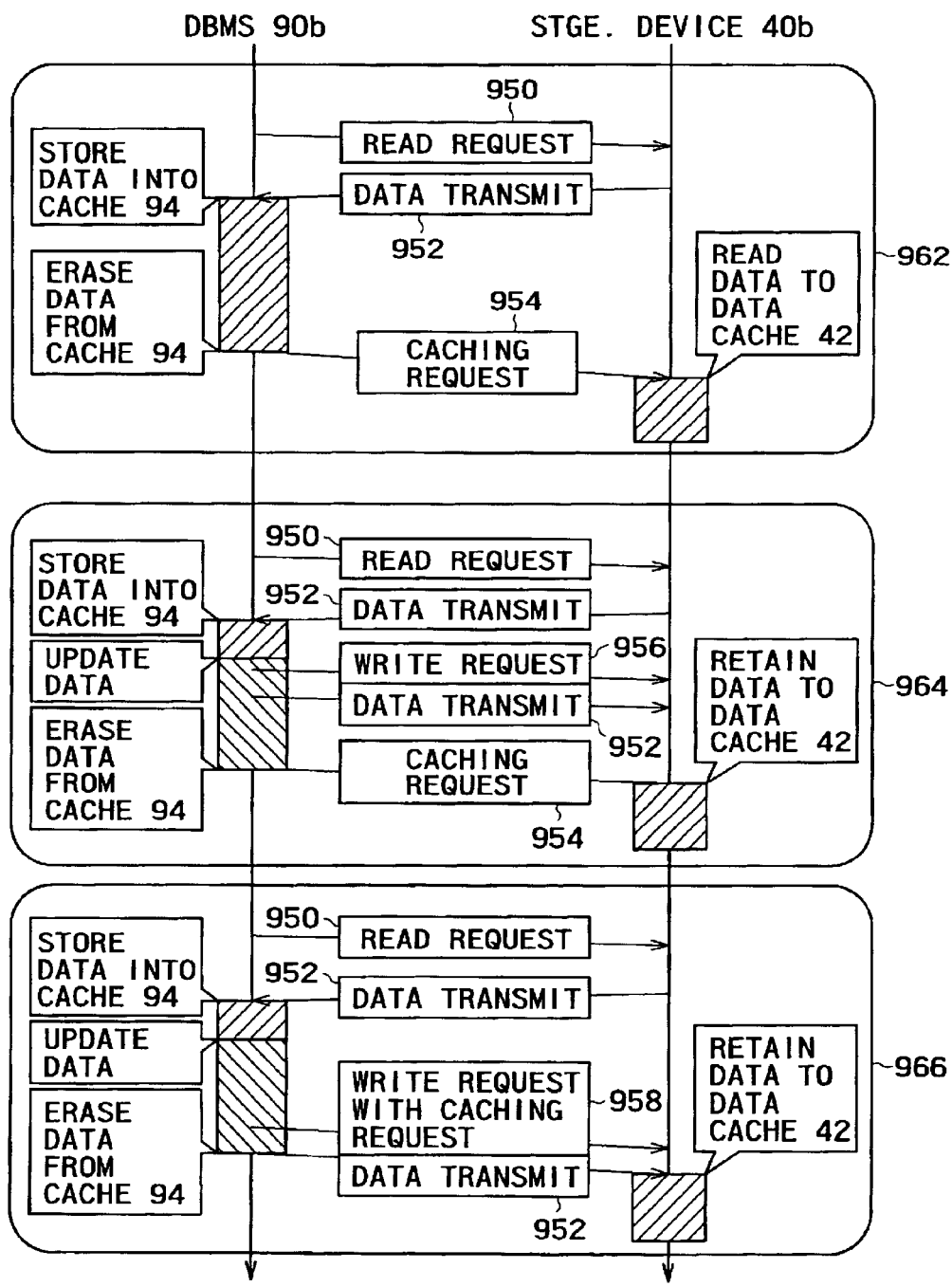
FIG. 12 shows data transfer control sequence between a DBMS and a storage device when a caching request and a write request with caching request are used.

FIG. 12 is a diagram for explaining data transfer control sequence between the DBMS 90b and storage device 40b when the caching request 954 and write request with caching request 958 are used. This figure consists of three box parts and, at the start of sequence in each box, both the DBMS 90b and storage device 40b do not hold the data to be processed in the sequence on the cache 94 and data cache 42. For simplifying the diagram, acknowledge replies are omitted.

The box 962 part shows data transfer control sequence for an instance that the DBMS 90 only reads data. First, the DBMS 90b sends a read request 950 to the storage device 40b and, in reply to the read request, the storage device 40b transfers the requested data to the DBMS 90b (data transfer 952). After transferring the data, the storage device 40b does not cache the data to the data cache 42. The DBMS 90b stores the transferred data to the cache 94. When erasing the data from the cache 94, the DBMS 90b sends a caching request 954 to the storage device 40b in the same manner as sending the read request 950. When having received the caching request 954, the storage device 40b reads the requested data from the specified HDD 16 and caches it to the data cache 42.

The box 964 part shows first data transfer control sequence for an instance that the DBMS 90b updates data. This sequence is the same as the sequence shown in the box 962 until the DBMS 90b reads the data to the cache 94. Then, the DBMS 90b updates the data on the cache 94 and transfers the updated data to write it to the storage device 40b (write request 956+data transfer 952). The storage device 40b writes the received data to the specified HDD 16, but does not cache the data to the data cache 42. Then, when erasing the data from the cache 94, the DBMS 90b sends a caching request 954 to the storage device 40b. When having received the caching request 954, the storage device 40b reads the requested data from the specified HDD 16 and caches it to the data cache 42.

The box 966 part shows second data transfer control sequence for an instance that DBMS 90b updates data. This sequence is the same as the sequence shown in the box 964 until the DBMS 90b updates the data on the cache 94. In this control, after updating the data, the DBMS 90B does not write the data to the storage device 40b until erasing the data from the cache 94. When erasing the data from the cache 94, the DBMS 90b transfers the updated data to write it to the storage device 40b and, at the same time, issues a caching request (write request with caching request 958+data transfer 952). When having received the write request with caching request 958, the storage device 40b writes the data and caches the written data to the data cache 42. Writing the data to the specified HDD 16 is performed when appropriate.

The instance where the manner of caching data, using the caching request 954 was mentioned above, caching data may be performed in a such way that the DBMS 90b always the write request with caching request 958 when erasing the data. In that event, the entities need not be capable of processing the caching request 954.

FIG. 13 illustrates a data structure example of cache group information 460b. Unlike the corresponding information list used in Embodiment 1, an entry to hold hint function 468 is added per entry to hold cache group ID 462. The hint function 468 is information to indicate whether the cache hint function is enabled or disabled and contains "ON" when enabled and "OFF" when disabled. When the hint function 468 is "ON," caching control is performed as described above. When the hint function 468 is "OFF," a commonly used cache data management method is applied. For example, the data retained on the data cache 42 is managed by the LRU cache replacement algorithm and, when data is accessed, the accessed data is counted as MRU data independent of the data type.

FIG. 14 illustrates a data structure example of table data size information 700. The table data size information 700 list comprises the following entries: an entry to hold the data structure name 346 of a table, an entry to hold data page size 702 which specifies data page size in the table, an entry to hold data pages 704 which the table uses, and an entry to hold cache space 466 which specifies cache space available for the data in the cache 94.

FIG. 15 illustrates a data structure example of B-Tree index information 710. The B-Tree index information 710 list comprises the following entries in a set: an entry to hold the data structure name 346 of an index, an entry to hold the corresponding table name 712 which is the data structure name 346 of a table with the index attached thereto, an entry to hold data page size 702, an entry to hold data pages 704, an entry to hold leafnode pages 714 which are data pages that hold leafnode data of B-Tree index among the data pages, an entry to hold cache space 466 for the index, an entry to hold attribute to search 716 which specifies one or more attribute names 352 of the attribute(s) to search by using the index, and an entry to hold expected tuples 718 which specifies the number of tuples expected to be obtained by one search of data of the attribute to search 716. For one index, there may exist a plurality of attributes to search 716 and the corresponding number of entries of expected tuples 718. The expected tuples 718 are obtained through analysis of the corresponding table data and averages, mode, or values calculated from several types of indexes may be used to obtain the tuples.

A procedure for setting cache space in the DBMS 90b and storage device 40b in Embodiment 2 will be described hereinafter. The system management program 140 carries out this procedure.

Figure 16:
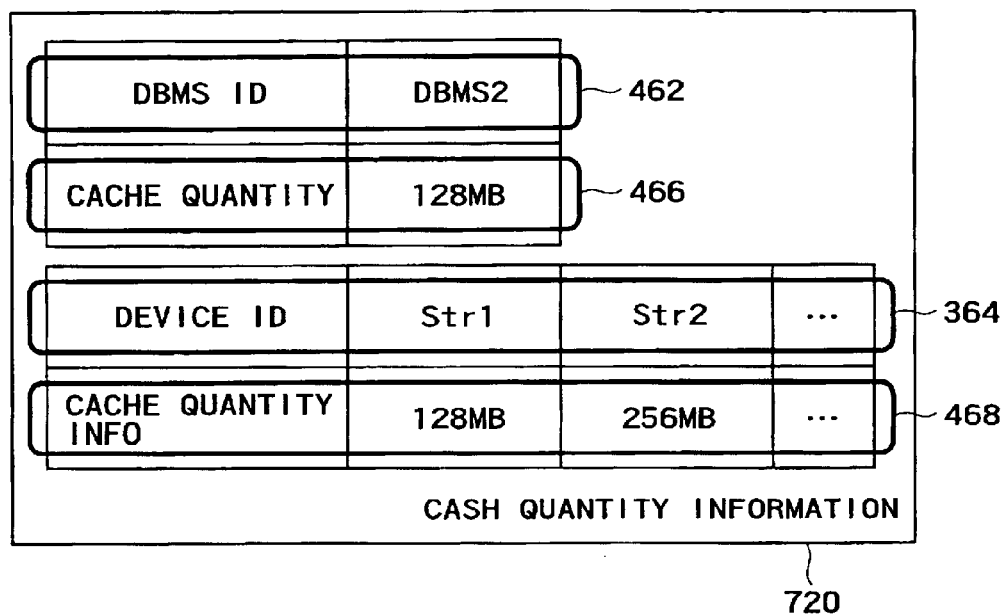
FIG. 16 illustrates a data structure example of cache space information.

FIG. 16 illustrates a data structure example of cache space information 720. The cache space information 720 is information about cache space available in the DBMS 90b and storage device 40b, which is supplied to the system management program 140 prior to the start of the procedure. The cache space information 720 list comprises a couple of entries: an entry to hold the DBMS ID 582 of a DBMS 90b for which the process is executed and an entry to hold cache space 722 which specifies cache space available on the cache 94 of the DBMS 90b. The list further comprises a couple of entries: an entry to hold device ID 572 which is the identifier of a storage device 40b (device) which holds data to be applied in the process and an entry to hold cache space 722 which specifies cache space available on the data cache 42 of the storage device.

Figure 17:
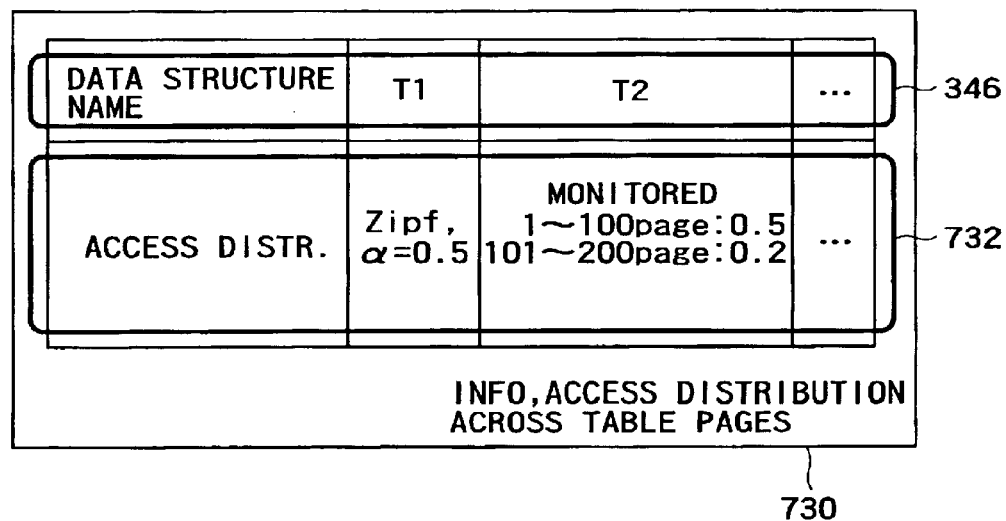
FIG. 17 illustrates a data structure example of information, access distribution across table pages.

FIG. 17 illustrates a data structure example of information, access distribution across table pages 730. This information is also supplied to the system management program 140 prior to the start of the procedure. The list of information, access distribution across table pages 730 comprises a couple of entries: an entry to hold the data structure name 346 of a table which is applied in the process and an entry to hold access distribution 732 which specifies access frequency distribution across data pages of the table. In the entry of access distribution 732, pages in certain blocks are dynamically sorted in descending order of access frequency which may be based on either theoretical values or measured values. If distribution cannot be obtained, follow Zipf distribution which is generally applied. When F(k) is defined to represent access probability of a data page with the k-th high access probability, it is assumed that $F(k)=C/k^a$ (a: parameter (0<=a), C: correction coefficient $(C=1/S(1/k^a))$). If the number of data pages is small, set a nearer to 0 (for example, 0.25). If the number of data pages is great, set a nearer to 1 (for example, 0.75). If a process with time locality is performed, such as a process in which data insertion is performed and the inserted data is updated after the elapse of a certain time, data in a limited range would be accessed accordingly. Thus, it may be assumed that no access to a certain portion of data pages (for example, 80%) will occur (access probability of 0).

FIG. 18 illustrates a data structure example of information, expected data pages to access 780 which the system management program 140 holds in the system management information 142 part. The list of information, expected data pages to access 780 comprises the following entries in a set: an entry to hold process ID 432, an entry to hold the data structure name 346 of a data structure which should be accessed during the process, and an entry to hold expected data pages to access 784 which specifies how many discrete data pages in the data structure are expected to be accessed during the process. The entry of expected data pages to access 784 consists of the columns of an entry to hold a total of data pages to be accessed for both reference and update (including data insertion) and an entry to hold the number of pages to be accessed for update (excluding reference only).

The administrator may supply the information, expected data pages to access 780 as design information. Or, prior to the start of the procedure for setting cache space, process design information 850 may be supplied to the system management program 140 and, from this information, the information, expected data pages to access 780 may be created in a procedure that will be described below. In that event, the process design information 850 may not include the entries of rerun rate 856 and the maximum time required for rerun 858.

First, refer to the SQL statements to be executed 850 from the process design information 850, obtain the SQL execution schemes of these SQL statements from the DBMS 90b, and identify data structures to be accessed in the processing steps and access modes (including data insertion/update). Using this result and the B-Tree index information 710 obtained from the DBMS 90b, obtain data size (tuples) to be processed in the processing steps in the SQL execution schemes SQL. From the thus obtained data structures to be accessed, access modes, and data size to be processed in the processing steps, obtain the number of data pages to be accessed and access purpose (reference/update). At this time, suppose that discrete tuples essentially exist on different data pages. However, it may also be preferable to include information about how the tuples to be looked for by the B-Tree index are distributed across the data pages in the B-Tree index information 710 and obtain the number of data pages to be accessed more exactly, using such information. It may also be possible to make the DBMS 90b internally estimate the number of data pages to be accessed per SQL statement, as all or part of this procedure, when creating the SQL execution schemes, and output the estimated values together with the SQL execution schemes, and use the estimated values. Multiply the obtained number of data pages to be accessed per SQL statement by the expected repetition rate 864 for the SQL statement to be executed 860 and set the products in the list of information, expected data pages to access 780.

Figure 19:
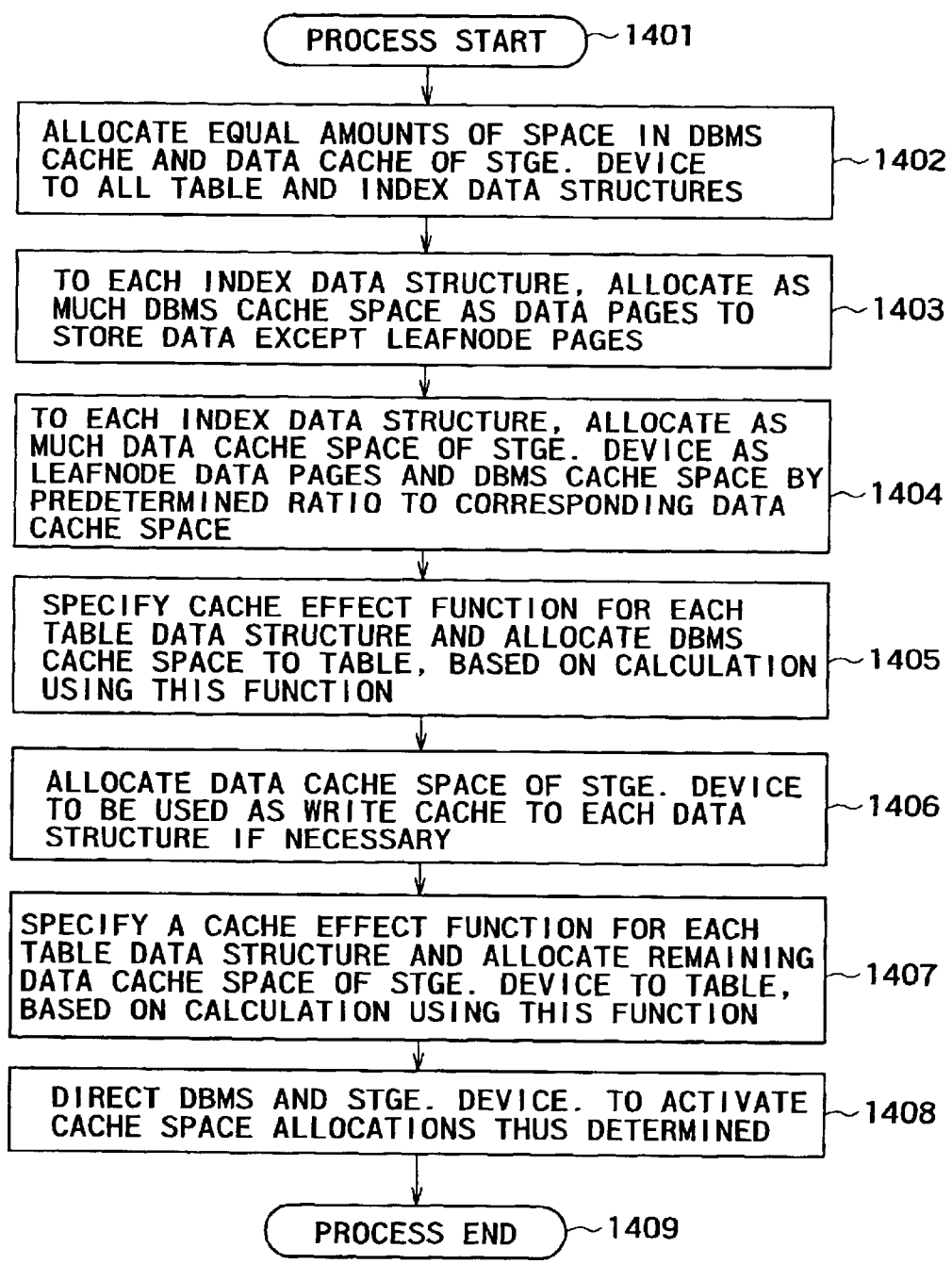
FIG. 19 shows a process flow of processing for setting cache space in a DBMS and a storage device, according to a preferred Embodiment 2 of the invention.

FIG. 19 is the process flow of a procedure for setting cache space in the DBMS 90b and storage device 40b. In this process, cache space to be allocated to each data structure should be determined for the DBMS 90b and storage device 40b. Prior to the start of the procedure, the information, expected data pages to access 780 should be held in the system management information 142 part. Prior to the start of the procedure, the process design information 850b, cache space information 720, and information, access distribution across table pages 730 are supplied. The process design information 850b differs from the process design 850 used in Embodiment 1 in that it does not have the entries of SQL statement to be executed 860 and expected repetition rate 864. The description of this process flow assumes that the DB and its storage space to be used to execute the processes have been defined in advance. However, in the absence of the information to be obtained from the DBMS 90 and virtualize facilities involved, the administrator should supply such information as design information separately and this process can be performed. (Step 1401)

First, allocate predetermined equal amounts of cache available in the cache 94 of the DBMS 90b and the data cache 42 of the storage device 40b to all table and index data structures as minimum necessary cache space allocations for executing the processes.

The storage device 40b to which data should be stored in all steps of this process can be identified from the mapping aggregate information retained in the system management information 142 part. If data should be stored to a plurality of storage devices 40b, unless otherwise specified, determine the percentages of the storage devices 40b in storing the whole amount of data from the mapping aggregate information and set cache space allocations in proportion to the percentages. For the DBMS 90b and storage device 40b, the upper limit of available cache space is specified in the cache space 722 entry of the cache space information 720 list. A request for cache space more than the upper limit is rejected as an error and the process terminates. (Step 1402)

Next, obtain the B-Tree index information 710 from the DBMS 90b. Then, for each index, determine the data quantity of data pages to store data except leafnodes from the difference between the number of data pages 704 and the number of leafnode pages 714 and the data page size 702 in the obtained information and allocate space available in the cache 94 as much as the determined data quantity of data pages to each index data structure. (Step 1403)

Then, for each index, determine the data quantity of leafnodes from the number of leafnode pages 714 and the data page size 702 and allocate space available in the data cache 42 as much as the determined data quantity of leafnodes and space available in the cache 94 by a predetermined ratio (for example, 20%) to the corresponding data cache space to each index data structure. (Step 1404)

Figure 20:
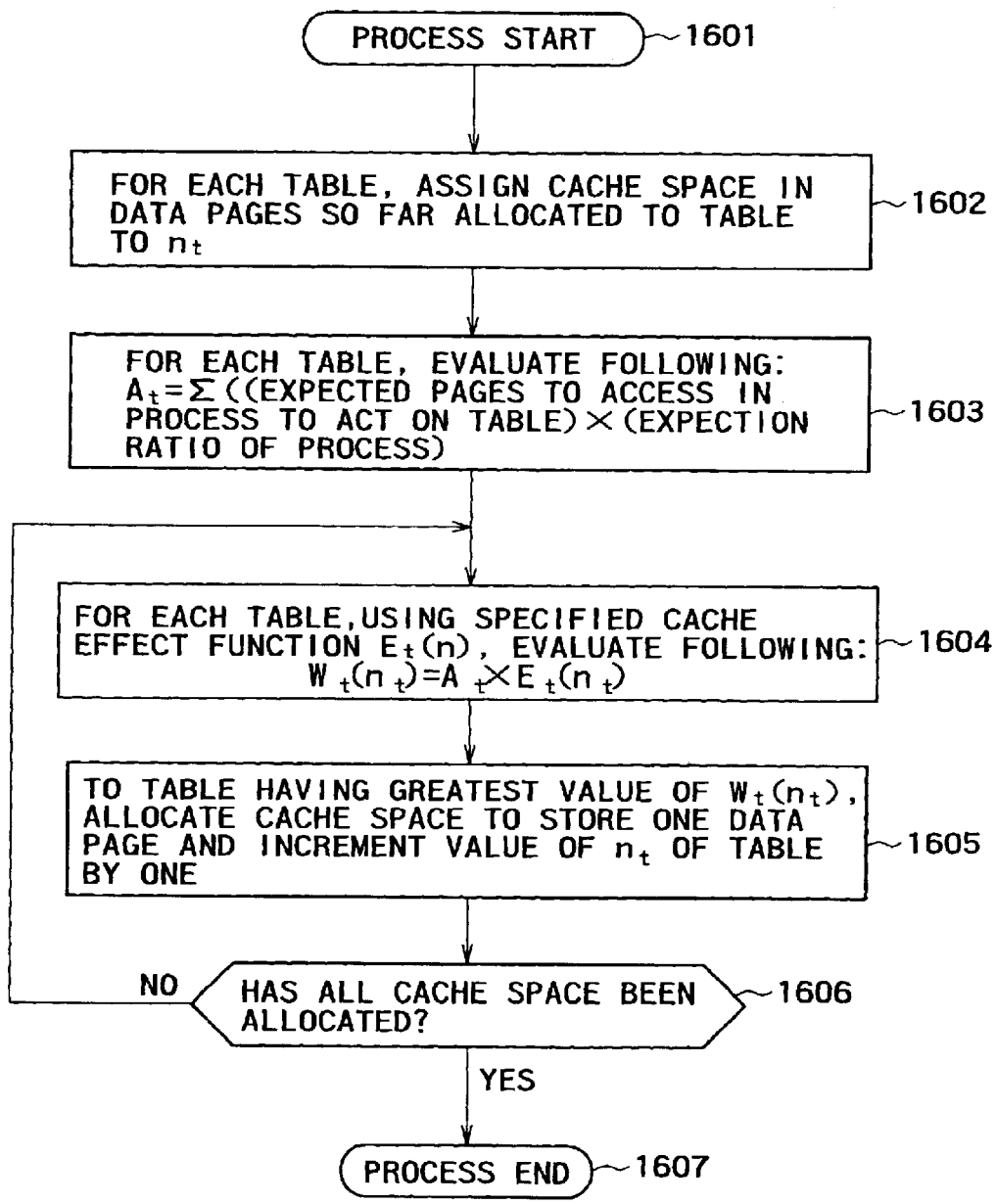
FIG. 20 shows a process flow of processing for determining cache space allocations, using a cache effect function.

Specify a cache effect function for each table, carry out a procedure of FIG. 20 starting from step 1601, and specify space available in the cache 94 to each table data structure. Here, the cache effect function E(i) is defined as "increment of probability that data being accessed already exists on the cache (cache hit) as the number of data pages retainable on the cache increases from i−1 to 1." Hence, SE(i)=1. Here, as approximation, the access distribution 732 specified in the list of information of access distribution across table pages 730 is given as is. However, the cache effect function may be defined separately, based on the access distribution 732. (Step 1405)

If the data cache 42 of the storage device 40b is used as a write cache as well, allocate space for write use in the data cache 42 to each data structure. First, refer to the information, expected data pages to access 780 included in the process design information 850b and obtain processes for which the number of expected data pages to access 784 for update is not 0. Determine the number of expected data pages to update per data structure when one of these processes is executed, taking account of weight by the execution ratio 862 of the process specified in the process design information 850b from the appropriate entry of expected data pages to access 784 for update. Next, determine the maximum number of processes that can be executed during a rerun from the rerun rate 856 and the maximum time required for rerun 858 in the process design information 850b and calculate the product of the thus determined value and the number of expected data pages to update per data structure, previously determined for the process including expected update events.

Compare the thus calculated product value and a value of the space now allocated to the data structure in the cache 94 multiplied by a predetermined percentage (for example, 70%). Set the former value or the latter value which is smaller as write cache space required for the data structure. If space allocated to the data structure in the data cache 42 is less than the above required write cache space, increase the space allocated to the data structure in the data cache 42 up to the required space. If the storage device 40b duplicates written data, cache space twice as much as the determined space per data structure should be required as necessary.

This step is not necessarily to be performed. If this step is skipped, the rerun rate 856 and the maximum time required for rerun 858 need not be retained in the process design information 850b. (Step 1406)

Specify the cache effect function for each table, carry out the procedure of FIG. 20 starting from step 1602, and allocate space in the data cache 42 to each table data structure. For the cache effect function, here, again, as approximation, the access distribution 732 specified in the list of information of access distribution across table pages 730 is given as is. However, the cache effect function may be defined separately, based on the access distribution 732.

Especially, taking account of difference between the method of controlling the cache 94 of the DBMS 90b and the method of controlling the data cache 42 of the storage device 40b, a function different from the one given in the step 1405 may be used. (Step 1407)

Issue directives to activate cache space settings determined in the above procedure to the DBMS 90b and storage device 40b. If a DB to be used for caching is not yet defined within the DBMS 90, define the DB and reserve storage space and, at the same time or later, carry out this step.

Cache space directives to the storage device 40b are performed as follows. Refer to the mapping aggregate information and identify the LUs 208 to hold data for the data structures to be accessed during the execution of processes. If the LU(s) belongs to a free cache group, direct the storage device 40b to create a cache group consisting of the LU(s) to which the data of the same data structure should be stored. Then, activate the cache space settings for the cache groups, each group consisting one or more LUs 208 to store the data structures. If the data of a data structure is stored to a plurality of LUs 208 belonging to different cache groups, obtain data size that is stored on each LU from the mapping aggregate information and reserve space for cache allocation on each LU proportionally. If it turns out that two or more data structures belong to a same cache group from the mapping aggregate information, set the sum of the cache space allocations to these data structures as the cache space to be provided by the cache group. When cache space allocations determined by this process are activated, if cache allocation for other data has been performed, obtain the cache space allocated for the other data separately, as necessary, from the previous cache space settings for the cache groups. (Step 1408)

Then, the process terminates. (Step 1409)

This process may be carried out to set cache space allocations in only the data cache 42 of the storage device 40b. In that event, the cache space allocations to the data structures in the cache 94 of the DBMS 90b are given at the start of the procedure and the processing for the cache 94 in the steps 1402 to 1405 and 1408 is skipped.

FIG. 20 shows the process flow of a procedure for determining cache space allocations, using the cache effect function. This procedure is integrated into, as a part of, the procedure of FIG. 19 starting from 1401 and can use all the information available for the procedure of FIG. 19. In the following, for explanation purposes, tables to be accessed during the execution of processes are assigned serial numbers t and constants, functions, and the like which are value assigned for each table are identified by these serial numbers. At the start of this procedure, for each table, the following are given: cache effect function Et(i) and data specifying the cache 94 of the DBMS 90b or the data cache 42 of the storage device 40b for which the procedure of determining cache space allocations will be performed. Moreover, a method of determining cache space allocations is specified as necessary. (Step 1601)

Obtain cache space so far allocated to each table and assign its size in data pages to $n_t$. In this relation, obtain the cache space as a total of space allocated to the table in the cache 94 and space allocated to the table in the data cache 42, unless otherwise specified at the start of the procedure. (Step 1602)

Next, for each table, evaluate the following:

$A_t = S((\text{expected pages to access in process to act on the table (total)}) \times (\text{execution ratio of process})$ Here, S denotes the total sum of the processes to be executed. The number of expected pages to access in process to act on the table can be obtained from the information, expected data pages to access 780, and the execution ratio of process can be obtained from the process design information 850b. (Step 1603)

Next, using the cache effect function specified for each table, evaluate the following:

$W_t(n_t) = A_t \times E_t(n_t)$ (Step 1604)

Select a table having the greatest value of $W_t(n_t)$ obtained in step 1604 and allocate cache space to store one data page to the table.

When allocating the above cache space in the data cache 42, after selecting the table having the greatest value of $W_t(n_t)$, perform the following. Referring to the mapping aggregate information, obtain how much are the portions of the table data size respectively stored to the storage devices 40b, and share the cache space allocated to the table in the data cache 42 between the storage device 40b in proportion to the portions. In this relation, if, for a particular storage device 40b, the sum of the space allocations in the data cache 42 to the data structures is equal to the value specified in the cache space 722 entry in the list of cache space information 720, cache space allocation in the storage device 40b is regarded as impossible and additional cache space allocations should be performed for only the other storage device 40b. If cache space allocation in the data caches 42 of all storage devices 40b that hold the data contained in the selected table is determined impossible, cache space allocation to the table is not performed. Select another table having the next greatest value of $W_t(n_t)$ as the object to which to allocate cache space and repeat the same checking.

Then, increment the value of $n_t$ of the selected table by one.

(Step 1605)

Check whether all cache space has been allocated and, if allocable cache space remains unallocated, return to step 1604. If cache space allocations have been completed (further allocations are impossible), go to step 1607 and the process terminates. (Step 1606)

Now, the process terminates. (Step 1607)

In Embodiment 2 described hereinbefore, it is assumed that the storage device 40b provides LUs 208 to external entities and the LUs are accessed via the I/O paths 34. However, in some implementation, it may also preferable that the storage device 40b provides files 202 to external entities and the files 202 are accessed via the network 24 through the use of network file system protocols, as mentioned for Embodiment 1. In that event, the same corresponding relationships as described for Embodiment 1 are applied.

Main difference is that cache group members are managed in units of files 202 on the storage device 40b and in the above-described procedure to be carried out in Embodiment 2, the LUs 208 are replaced by the files 202 on the storage device 40.

Embodiment 3

The cache management method according to a preferred Embodiment 3 of the invention is to optimize initial cache space allocations for table and index data, based on design information about processes to be executed by the DBMSs, provided the caching request 954 and write request with caching request 958 are not used, though such requests are used in Embodiment 2. In other words, the DBMS cache and the storage device's data cache are managed separately in Embodiment 3 on the assumption that partial data duplication on both caches may occur, which differs from Embodiment 2.

The computer system configuration of Embodiment 3 is essentially similar to that of Embodiment 2. The system of Embodiment 3 will be described below, focusing on the difference from Embodiment 2.

As mentioned above, the caching request 954 and write request with caching request 958 are not used in Embodiment 3. Therefore, the system includes the storage devices 40, virtualize switches 60, and OS 72 which are the same entities as in Embodiment 2, instead of the storage devices 40b, virtualize switches 60, and OS 72, respectively. DBMSs 90c replace the DBMSs 90b and do not have the function of transmitting the caching request 954 and write request with caching request 958.

On the storage device 40, a commonly used method is applied to manage data on the data cache 42. For example, data retained on the data cache 42 is managed by the LRU cache replacement algorithm and data being accessed is counted as MRU data independent of the data type.

Figure 21:
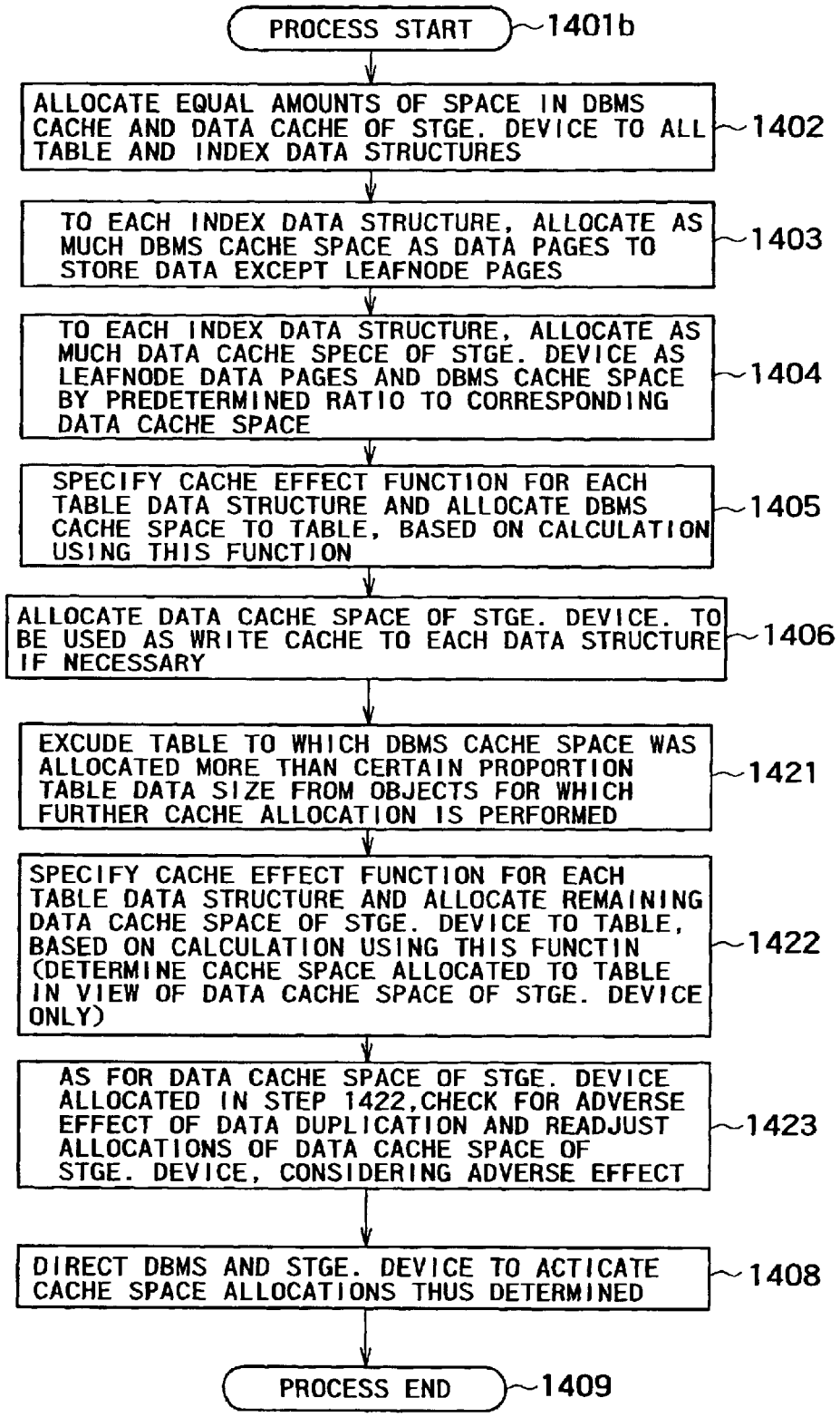
FIG. 21 shows a process flow of processing for setting cache space in a DBMS and a storage device, according to a preferred Embodiment 3 of the invention.

The procedure for setting cache space of FIG. 19 starting from step 1401 is changed to the procedure of FIG. 21 starting from step 1401b in Embodiment 3. FIG. 21 is the process flow of a procedure for setting cache space in the DBMS 90c and storage device 40, starting from step 1401b. In the process starting from step 1401b, the step 1407 which is performed in the process starting from step 1401 is changed to steps 1421 to 1423. This process may be carried out to allocate cash space in only the data cache 42 of the storage device 40, as is the case for the corresponding process of Embodiment 2.

Obtain the data sizes of the tables from the table data size information 700, screen the tables; that is, exclude a table to which cache 94 space was allocated more than a certain proportion (for example, 90%) to the table data size from the objects for which space will be allocated in the data cache 42 of the storage device 40 in the subsequent step. (Step 1421) Next, specify the cache effect function for each table, carry out the procedure of FIG. 20 starting from step 1601, and allocate space available in the data cache 42 to each table data structure, which is the same as step 1407. In this relation, give instructions to obtain cache space so far allocated to each table, which is set in step 1602, taking account of allocated space in only the data cache 42 of the storage device 90. The cache effect function which does not take account of data duplication between the cache 94 and the data cache 42 should be given. As approximation, the access distribution 732 specified in the list of information of access distribution across table pages 730 is given as is. Alternatively, the cache effect function may be defined separately. Space in the data cache 42 allocated in this step is stored separately from the total space allocated. (Step 1422)

As for the data cache 42 space allocated in step 1422, take account of decrease in the cache effect of the data cache 42 because of data duplication between the cache 94 and readjust the space allocated in the data cache 42. In Embodiment 3, area less than a value (which is represented by $N_t$ hereinafter) obtained by multiplying the available space now allocated in the cache 94 by a certain percentage (for example, 80%) is determined ineffective even if the data cache 42 is used. First, exclude the table(s) for which space allocation in the data cache 42 has not been performed in step 1422 from the readjustment objects.

Next, check whether the cache effect works for the table(s) for which space allocation in the data cache 42 has been performed in step 1422. Check all tables of adjustment objects, according to criterion $n_t-N_t<0$ where $n_t$ is space in data pages now allocated to the table in the data cache 42. Among tables that meet this criterion, if exist, for a table having the smallest value of $n_t-N_t$, deallocate all the space allocated in the data cache 42 in step 1422 and subsequent and exclude it from the adjustment objects. For this table, carry out space allocation in the data cache 42 of step 1422 again. As long as a table that meets the criterion exists, repeat this check and cache space reallocation. If, as the result of the check, data cache 42 spaces allocated in step 1422 must be deallocated for all tables, this is regarded as an error event and the process terminates. Instead of the criterion $n_t-N_t<0$, criterion $(n_t-N_t)/W_t(N_t)<0$ (using $W_t(i)$ defined in step 1604) may be used in order to make the criterion have stronger reflection of the cache effect and other criteria may be used.

Moreover, in order to enhance the cache effect, if all tables of adjustment objects meet condition $n_t-N_t>0$, adjust cache space allocation, taking the cache effect into account. For all tables of adjustment objects, evaluate $V_t=SW_t(i)$ (where S denotes the sum of $N_t<=i<=n_t$) and select a table having the smallest value thereof. Deallocate the data cache 42 space allocated to the table in step 1422 and subsequent and allocate the deallocated space to another table of adjustment object in the same manner as step 1422. This cache allocation readjustment should be performed, provided the sum of $W_t(i)$ values for the table to which the deallocated space is allocated is greater than $V_t$ for the table for which the data cache 42 space was deallocated. Repeat this check and readjustment until it is determined that readjustment should not be performed. (Step 1423)

In Embodiment 3 described hereinbefore, it is assumed that the storage device 40 provides LUs 208 to external entities and the LUs are accessed via the I/O paths 34. However, in some implementation, it may also preferable that the storage device 40 provides files 202 to external entities and the files 202 are accessed via the network 24 through the use of network file system protocols, as mentioned for Embodiment 1. In that event, the same corresponding relationships as described for Embodiment 1 are applied.

Main difference is that cache group members are managed in units of files 202 on the storage device 40 and in the above-described procedure to be carried out in Embodiment 3, the LUs 208 are replaced by the files 202 on the storage device 40.

Embodiment 4

The cache management method according to a preferred Embodiment 4 of the invention is to enhance the cache effect by tuning data cache space provided in the storage device, based on design information about processes to be executed by the DBMSs in combination with cache operating statistics information. The above method is to find an optimum cache allocation method, based on estimates in change in process execution time when cache space is reconfigured for a process determined undesirable and all processes and such estimates are made by combining expected data pages to be accessed during processes obtained by pre-analysis and cache operating statistics information.

Figure 22:
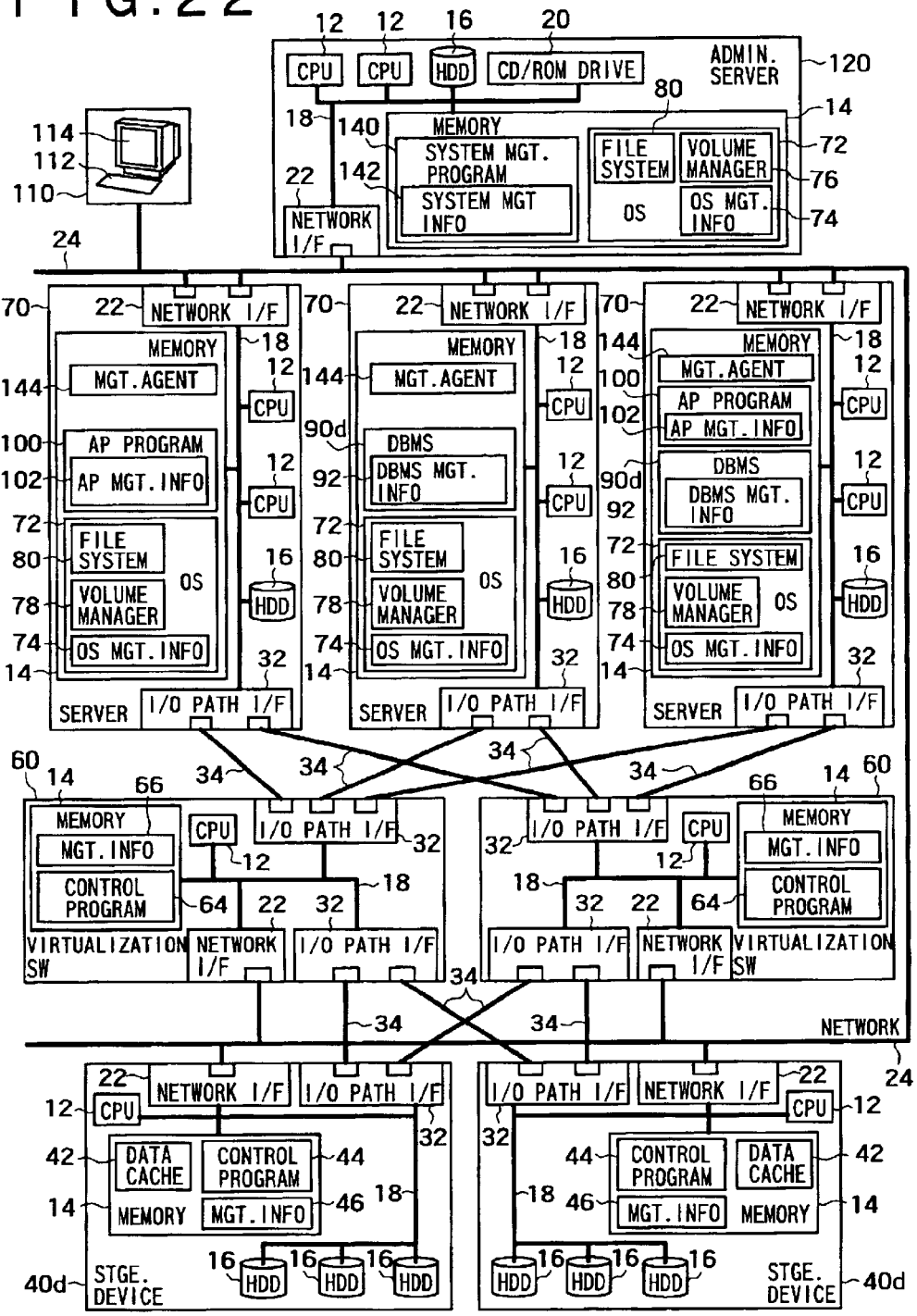
FIG. 22 shows a computer system configuration according to a preferred Embodiment 4 of the invention.

FIG. 22 is a diagram showing a computer system configuration according to a preferred Embodiment 4 of the invention. The computer system configuration of Embodiment 4 is essentially similar to that of Embodiment 1. The system of Embodiment 4 will be described below, focusing on the difference from Embodiment 1.

In Embodiment 4, storage devices 40d which replace the storage devices 40 obtain operating statistics information on the data caches 40. On the storage device 40d, cache data replacement control for cache groups is performed independently by using the LRU cache replacement algorithm. As regards the storage area of data uncached from the data cache 42 by data replacement by the above algorithm, a certain size of such area and its information are stored in the management list of the LRU cache replacement algorithm as virtual managerial area even after the data is replaced and used in measuring operating details. The control program 44 measures the operating details of the data cache 42 and retains the measurements as cache monitored statistics information 362 in the management information 46 part. In this relation, the management list of cache segments (space management units of the data cache 42) of the LRU cache replacement algorithm is divided into a plurality of equal size partitions and hits per partition are measured. Moreover, as for virtual management partitions corresponding to real management partitions (in which cache segments are actually allocated to data), hits per partition are measured similarly. The storage device 40d has a function of transmitting the cache monitored statistics information 362 to an external entity via the network 24 in response to request from the external entity.

The DBMSs 90 are replaced by DBMSs 90d which use area on the memory 14 as the cache 94. The DBMS 90d collects operating statistics information, the count of wait occurred when accessing internal resources such as software functions for internal use and data pages of data structures, and retains such information in the DBMS management information 92 part, as DBMS monitored statistics information 410. Especially, the DBMS in Embodiment 4 holds the cumulative count of wait occurred when accessing data pages per data structure.

On the servers 70, an AP program in addition to the DBMS 90d runs. The AP program is a program running on the server for user's work purposes and issues a process request to the DBMS 90d. The AP program 100 is read from an HDD 16 of storage device 40 to the memory 14 and executed by the CPU 12. The AP program 100 which has been read to the memory 14 has AP program management information 102 as its management information.

The AP program 100 in Embodiment 4 is realized as a set of one or more processes and each process is assigned process ID 432. The user issues a request for any process execution to the AP program 100 and the AP program 100 executes the process by the request. The AP program 100 queues process requests received so that a process request issued from the AP program 100 to the DBMS 90d can be executed immediately by the DBMS 90d. The AP program 100 acquires execution statistics information for processes and holds such information as online jobs monitored statistics information 430 in the program management information 102 part. The AP program 100 has a software interface allowing an external program to read the AP program management information 102.

On a single sever 70, a plurality of DBMSs 90d and a plurality of AP programs 100 may be run concurrently. Alternatively, a DBMS 90d and an AP program 100 run on different servers 70 and, in that event, the AP program 100 transfers a process request to the DBMS 90d via the network 24.

To the process objects that the management agent 144 executes, following instructions from the system management program 140, reading information stored in the AP program management information 102 part is added.

The system management program 140 need not have the data internal management method information 426 in the DBMS information 420 list retained in the system management information 142 part. Instead, the system management program 140 holds HDD performance information 612 in the system management information 142 part.

FIG. 23 illustrates a data structure example of cache monitored statistics information 362.

The cache monitored statistics information 362 is operating statistics information about cache hits per partition counted when the LUs 208 were accessed from external entities LU 208 and its list includes Real Mgt. Subcache Partitions 502 to specify the number of real management partitions and Virtual Mgt. Subcache Partitions 504 to specify the quantity of virtual management partitions created in units of the subcache partitions of real management. For statistics of cache hits per LU 208, this list also comprises the following entries in a set: an entry to hold LU ID 364, an entry to hold I/O type 366 which discriminates between Read and Write of access to the LU, an entry to hold cumulative count of execution 368 of I/O processing for the LU, and entries to hold cumulative count of cache hits 370 which contain the number of hits occurred when the LU was accessed. The entries of cumulative count of cache hits 370 hold the total of hits in the real management partitions and the cumulative counts of hits in each of both the real and virtual management partitions. In Embodiment 4, the real and virtual management partition are assigned serial numbers on an unified basis, and the partition in which the most recently used data exists is the first partition and the partitions with younger numbers have more recently used data.

FIG. 24 illustrates a data structure example of DBMS monitored statistics information 410. The list of the DBMS monitored statistics information 410 comprises a couple of entries: an entry to hold DBMS resource name 412, the name of a software function or data structure, and an entry to hold cumulative count of wait 414 which contains the cumulative number of times of wait occurred when accessing the resource FIG. 25 illustrates a data structure example of online jobs monitored statistics information 430. The online jobs monitored statistics information 430 is execution statistics information acquired by the AP program 100 and its list comprises the following entries in a set: an entry to hold process ID 432, an entry to hold the cumulative count of execution 368 of the process, and an entry to hold the cumulative process execution time 396 of the process whenever the process request was issued to the DBMS 90d (not including wait time for the process).

Figure 26:
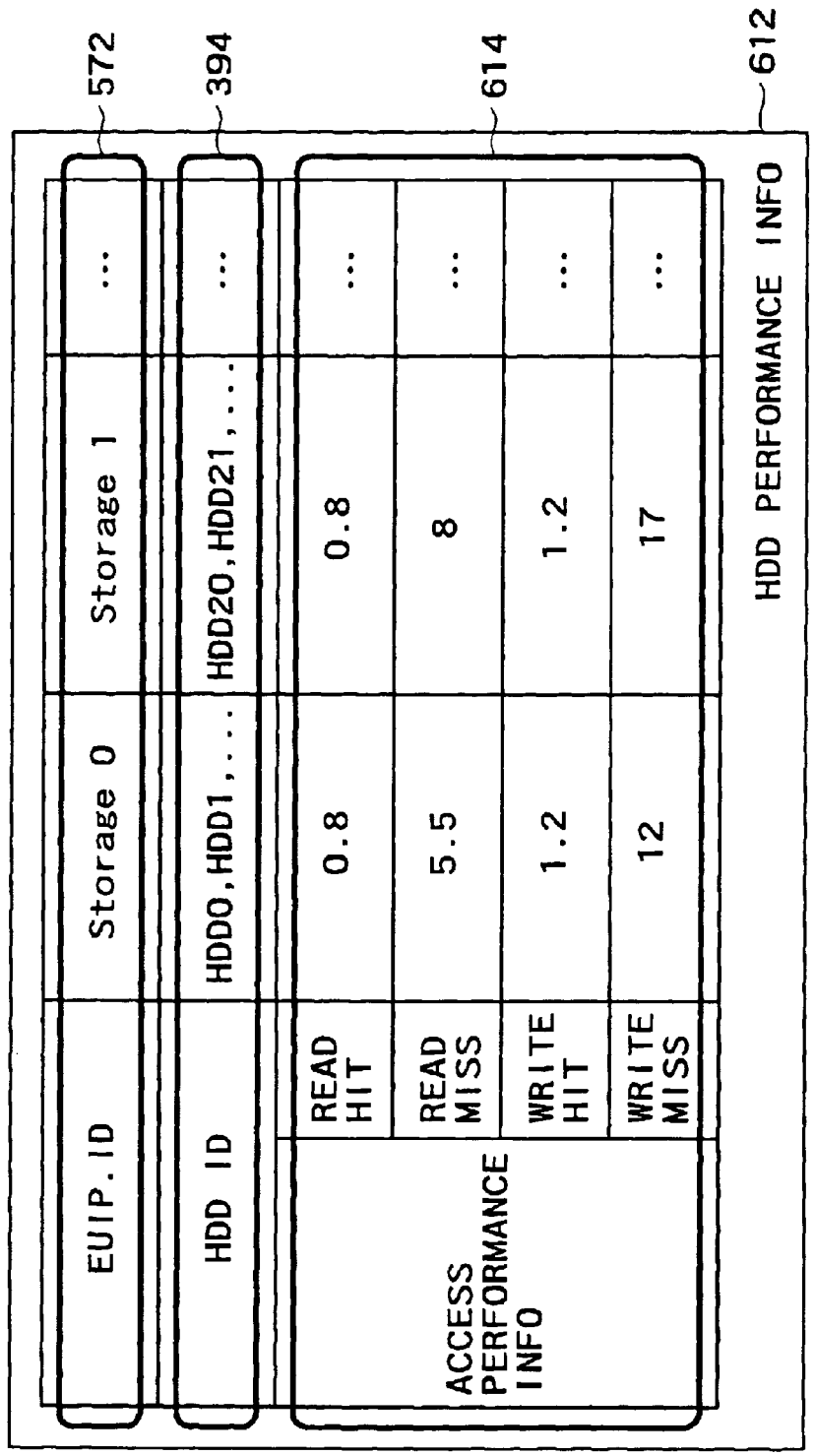
FIG. 26 illustrates a data structure example of HDD performance information.

FIG. 26 illustrates a data structure example of HDD performance information 612. The HDD performance information 612 is information about access performance of the HDDs 16 and its list comprises the following entries in a set: an entry to hold device ID 572 which is the identifier of a storage device 40d, an entry to hold HDD ID 394 which is the identifier of a HDD 16, and entries to hold access performance information 614 which contain access performance parameters of the HDD 16. The access performance information 614 entries hold the average response times for the following events: cache hit/miss for read in random access mode, cache hit/miss for write. This information is created by obtaining the designations of the HDDs 16 provided in the storage devices 40d and combining them with performance information per designation which have been given in advance.

A procedure of tuning cache space in the data cache 42, based on the combination of design information about the processes to be executed by the DBMS 94d and operating statistics information about the elements will be described hereinafter. The system management program 140 carries out this procedure.

First, the system management program 140 obtains the cache monitored statistics information 362, DBMS monitored statistics information 410, and online jobs monitored statistics information 430 (hereinafter these are referred to as "monitored statistics information" collectively) from the storage devices 40*d*, DBMSs 90*d*, and AP program 100, respectively, edits these items of information into a suitable form, and stores them in the system management information 142 part as monitoring history information 510.

FIG. 27 illustrates a data structure example of monitoring history information 510. Points at which operations are monitored (including the LUs 208 to be accessed for the cache monitored statistics information 362) are assigned monitored point IDs 514 which are unique within the system. The monitoring history information 510 list comprises the following entries in a set: an entry to hold monitored ID 514, an entry to hold information specifying what is monitored 516, entries to hold last data collection information 518, and entries to hold history information 520.

As what is monitored 516, one of the items to be monitored, as mentioned in explaining the data structure example of each item of monitored statistics information is specified. The last data collection information 518 consists of an entry of time when monitored statistics were acquired last and an entry of collected data number. The history information 520 consists of an entry to hold a history data item 522 which specifies what data was collected and stored and a plurality of entries for samples 524 monitored for a certain period. Data items to be set in the history data item 522 fields, which are used in Embodiment 4, are average counts of execution and average actual hit rates of read/write to/from the LUs 208 and average hit rates of reading from each partition (the number of read hits counted per partition during the specified period and the count of read execution to the LUs 208) from the cache monitored statistics information 362, average number of wait occurrences when accessing the data structures from the DBMS monitored statistics information 410, and average count of execution and average execution time per process in the AP program 100 from the online jobs monitored statistics information 430. Each sample 524 consists of an entry of period specifying when the stored data was being monitored, and entries to hold an average value and the maximum value, respectively, obtained from the data collected during the period.

Values are set in the monitoring history information 510 list as follows. The system management program 140 acquires the values at given intervals from the storage devices 40*d*, DBMSs 90*d*, and AP program 100 which obtain the monitored statistics information. After acquiring the data, from the time when the data was acquired last and the collected data number retained in the corresponding entries of last data collection information 518, the system management program 140 calculates a period during which the data was being collected and sample values from the data of history data item 522 collected during the period, sets the calculated sample values in the sample 524 fields, and sets time and quantity information about the data that has now acquired values in the corresponding entries of last data collection information 518. The system management program 140 repeats this operation. Moreover, the system management program 140 assembles the sample 524 values obtained for a continuous period and deletes old data samples 524 when appropriate.

The procedure of tuning data cache space, which is performed by the system management program 140, will be explained below. This procedure is carried out if, for example, the average response time of the AP program 100 falls less than a predetermined value. In principle, after checking the entities other than the data cache for bottlenecks, using execution and operating statistics information which is separately obtained, if it is ensured that all other entities are sane, this procedure should be performed.

Figure 28:
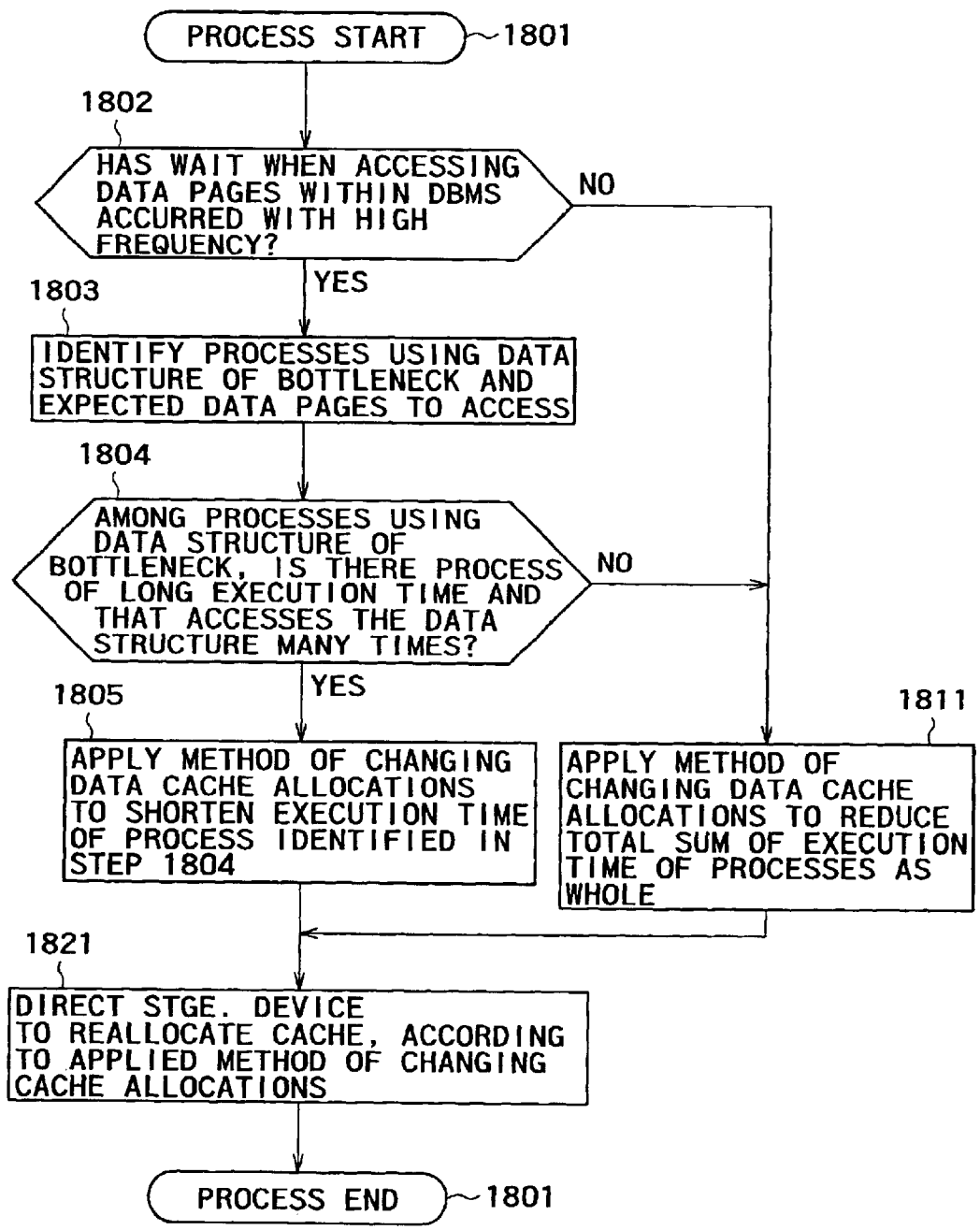
FIG. 28 shows the process flow of a main procedure of tuning data cache space.

FIG. 28 is the process flow of a main procedure of tuning data cache space. This procedure starts in response to a directive from the external. At this time, the following information is supplied: the DBMS ID 582 of a DBMS 90*d* which executes the processes of interest and the DB ID 854 of a DB which is used for the processes as the information about the object to be tuned and the information, expected data pages to access 780 as the result of pre-analysis of the processes. It may also be preferable to supply the process design information 850 instead of the information, expected data pages to access 780, and the information, expected data pages to access 780 can be obtained from the process design information in the same manner as described for Embodiment 2. In the information, expected data pages to access 780, it may also preferable to use expected data pages to access 784 compensated, taking account of different methods of locking data per process, which are determined from the level of data integrity and the grain size of a lock on data which are different for different processes.
(Step 1801)

First, check whether wait when accessing data pages of data structures within the DBMS 90*d* has occurred with high frequency. Identify the data structures to be used for the processes from the information, expected data pages to access 780 and obtain the average number of wait occurrences when accessing these data structures from the entry 524 to hold the most recently acquired value of this information in the history information 520 in the monitoring history information 510 list. If the average wait count associated with a data structure is equal to or more than a predetermined threshold, it is determined that wait has occurred with high frequency and go to step 1803. If the average wait count is less than the threshold for all data structures, it is determined that wait has not occurred with high frequency and go to step 1811.
(Step 1802)

Then, identify the processes using the data structure for which it has been determined that wait has occurred with high frequency in step 1802 and obtain the number of expected data pages to access (total) in the data structure, referring to the information, expected data pages to access 780. (Step 1803)

Next, among the processes identified in step 1803, check whether there is a process of long execution time and that accessed many times the data structure for which wait has occurred with high frequency. For the processes identified in step 1903, obtain the average count of execution and average execution time of the process from the entry 524 to hold the most recently acquired value of this information in the history information 520 in the monitoring history information 510 list and calculate the product of the average count of execution, average execution time, and the number of expected data pages to access the data structure obtained in step 1803. Compare the thus calculated values for all the processes, if the calculated value of a process is always higher than the others' by a predetermined factor (for example, higher by a factor of 4), it is determined that the process takes long execution time and accessed many times the data structure for which wait has occurred with high frequency, and go to step 1805. If such a process is not found, go to step 1811. (Step 1804)

Then, apply a method of changing cache allocations to enhance the cache hit rate of the data to be accessed during the process execution and shorten the execution time of the process identified in step 1804. Here, specify the process ID 432 of the process for which the execution time should be shortened, and a procedure of FIG. 29 starting from step 2701 is carried out for the process.
(Step 1805)

Then, apply a method of changing cache allocations to enhance the cache hit rate of the data to be accessed during execution of the processes and reduce the total sum of execution time of the processes as a whole. Here, specify nothing, and the procedure of FIG. 29 starting from step 2701 is carried out for the process.
(Step 1805)

Direct the storage device 40*d* to reallocate space in the data cache 42, according to the method of changing cache allocations applied in step 1805 or step 1811. Referring to the mapping aggregate information, identify the LU(s) 208 that hold the data of the data structure to be accessed during process execution and the cache group to which the LU(s) 208 belongs and issues directives to reconfigure cache space, according to the applied method of changing cache allocations to the cache group. If the data of a data structure is stored to a plurality of LUs 208 belonging to different cache groups, obtain data size that is stored on each LU from the mapping aggregate information and issue directives to reconfigure cache space proportionally.
(Step 1821)

Then, the procedure terminates. (Step 1822)

FIG. 29 is the process flow of a procedure of tuning space allocations in the data cache 42, based on the monitored statistics information. At the start of this procedure, if the purpose of applying this procedure is to shorten the execution time of a particular process, the process ID 432 of the process is given. If no process ID is given, the purpose of applying this procedure is regarded as shortening the execution time of the processes as a whole. This procedure is integrated into, as a part of, the procedure of FIG. 28 starting from step 1801 and can use all the information available for the procedure of FIG. 28. (Step 2701)

First, referring to the information, expected data pages to access 780, and mapping aggregate information, identify the storage device 40*d*, LU(s) 208, and cache group which hold the data structure to be accessed during process execution and obtain space allocated per process to the cache group in the data cache 42.
(Step 2702)

Then, calculate change in cache rate when changing the cache space. Here, suppose that, in the storage device 40*d*, Real Mgt. Subcache Partitions 502 is R and Virtual Mgt. Subcache Partitions 504 is V, and that the cache space now provided by a cache group to which an LU 208 belongs is C, the following can be assumed. In the entry portion of cumulative count of cache hits 370 of the list of cache monitored statistics information 362, the number of hits in the i-th partition (0<i<=R) will be lost if the cache space of the cache group to which the LU 208 belongs decreases from iC/R to (i−1)C/R and the number of hits in the i-th partition (R<i<=R+V) will be gained if the cache space increases from (i−1)C/R to iC/R. Since decrease in an average actual hit rate when the cache space decreases from C to C/R is an average hit rate in the R-th partition, when the cache space on the LU 208 falls within the range of (i−1)C/R to iC/R (0<i<=R), decrease in the average hit rate per unit cache space can be approximated as (average hit rate in the i-th partition)×R/C. Similarly, when the cache space falls within the range of (i−1)C/R to iC/R (R<i<=R+V), increase in the average hit rate per unit cache space can be approximated as (average hit rate in the i-th partition)×R/C. The average hit rate in the i-th partition (0<i<=R+V) when read access is performed is retained per LU 208 in the monitoring history information 510 list. The Real Mgt. Subcache Partitions 502 and Virtual Mgt. Subcache Partitions 504 in the storage device 40*d* are retained in the cache monitored statistics information 362 list held by the storage device 40*d* and can be obtained from the storage device 40*d*.

These values are calculated as change in hit rate for all LUs 208 that hold the data structure to be accessed during process execution. The most recently acquired value of sample 524 or an average of sample values acquired for a predetermined recent period should be obtained from the monitoring history information 510 in this and subsequent steps (step 2703)

Next, using the mapping aggregate information, identify HDDs 16 corresponding to the LU(s) 208 that holds the data to be accessed in process execution. Referring to the access performance information 614 per HDD 16 in the HDD performance information 612 list, obtain average response time for read hits and average response time for read misses of the HDDs 16 and calculate difference (average response time of read misses)−(average response time of read hits), use the calculated value as change in response time of the LU 208. If the data on a LU 28 is divided into parts which are stored to HDDs 16 of different performance, calculate change in response time per HDD 16 and obtain a weighted average of the calculated values for the HDDs 16 as change in response time, where the weights correspond to the portions of the data stored to the HDDs 16. (Step 2704)

For each storage device 40*d*, determine a method of changing cache allocations to increase the value of I:

I=S (average change in process time for data on LU), where (average change in process time for data on LU)=(change in response time)×(average read I/O count on LU)×(change in hit rate)

Apply change in response time obtained in step 2704. Change in hit rate can be obtained from change in hit rate and change in cache space allocated, obtained in step 2703. Note that change in hit rate varies, depending on the cache space provided by a cache group.

If the purpose of this procedure is to shorten the execution time of the processes as a whole (no process ID 432 has not been specified at the start of the procedure), S denotes the total sum of the values of I for the LUs 208 that hold the data structure to be accessed during execution of the processes in the storage device 40*d*. The average read I/O count on LU 208 can be obtained from the monitoring history information 510 and obtained value should be used as is.

If the process ID 432 of the process whose execution time should be shortened has been given, S denotes the total sum of the values of I for the LUs 208 that hold the data structure to be accessed during execution of the specified process in the storage device 40*d*. As for the average read I/O count on LU 208, only its contribution to the specified process should be taken into consideration. Assuming that the count of read processes to LU 208 during execution of the processes is proportional to the total number of expected data pages to access 784 in the list of information, expected data pages to access 780, calculate the ratio of read I/O operations relevant to the specified process, multiply the average read I/O count obtained from the monitoring history information 510 list by the calculated ratio, and use the product in calculating the value of I.

In order to determine a method of changing cache allocations, using I, for example, the following algorithm should be used. First, for the cache groups to which the LU(s) 208 that holds the data structure to be accessed during execution of the processes, calculate I if unit cache space increases and I if unit cache space decreases. Assuming that unit cache space has been deallocated from a cache group for which I becomes greatest when cache space decreases (with small influence) and reallocated to a cache group for which the value of I is greatest (with high effect) calculate a value of I. If the calculated value of I is greater than or equal to a threshold, the assumed cache allocation change is regarded as effective and should be performed. If the process ID 432 of the process whose execution time should be shortened has been given, concurrently, check for change in the value of I by the above cache allocation change, if valid, when taking account of execution time of its own process and other processes as a whole. If the changed I is less than another threshold which is not greater than 0 (has an adverse effect on the execution time of the processes as a whole), the cache allocation change is regarded as impracticable and seek for another method of changing cache allocations.

Assuming that cache allocations have changed differently, repeat the above checking and terminate the checking when it has been determined that further reallocation has no effect or when a predetermined amount of cache space (for example, a certain portion of the cache space reserved in the storage device 40d) has been reallocated. (Step 2705)

Then, the procedure terminates. (Step 2706)

In Embodiment 4 described hereinbefore, it is assumed that the storage device 40d provides LUs 208 to external entities and the LUs are accessed via the I/O paths 34. However, in some implementation, it may also preferable that the storage device 40d provides files 202 to external entities and the files 202 are accessed via the network 24 through the use of network file system protocols, as mentioned for Embodiment 1. In that event, the same corresponding relationships as described for Embodiment 1 are applied.

Main difference is that cache group members are managed in units of files 202 on the storage device 40d and in the above-described procedure to be carried out in Embodiment 4, the LUs 208 are replaced by the files 202 on the storage device 40d.

According to the present invention, in a computer system where DBMSs run, it is possible to perform cache space settings, taking account of characteristics of data differentiated by the purpose of use of data and process details. More effective use of data caches of storage device and optimum performance can be obtained.

Automatic cache space setting and turning in storage device are also feasible and the performance management cost of such a computer system would be reduced.

What is claimed is:

1. A device for setl:ing cache space in a data processing system including a computer on which a database management system runs, a storage device which includes a cache and stores data in databases which the database management system manages, and an administrative device which manages the computer and the storage device, wherein the computer, the storage device, and the administrative device are interconnected via a network, the device comprising:

means for acquiring information about database function process details to be executed by the database management system;

means for acquiring information about data mapping from the computer and the storage device;

means for creating planned cache space settings, using the acquired information about said database function process details and about said data mapping; and means for directing the storage device to activate cache space settings according to the planned cache space settings.

2. The device according to claim 1, wherein all the means are corresponding functions realized by a system management program provided on the administrative device.

3. The device according to claim 1, further comprising:

storage control means connected to the computer and the storage device and which controls data transfer between both;

mapping means for defining mapping to data on the databases in the storage control means; and means for acquiring information about mapping of data on the databases from the mapping means.

4. The device according to claim 1, wherein all the means are functions realized in the computer, the storage device, or the storage control means.

5. The device according to claim 1, wherein the administrative device includes means for acquiring, as information about the database function process details to be executed by the database management system, SQL statements to be executed for the process and an expected count of execution of the SQL statements.

6. The device according to claim 5, wherein the administrative device includes means for acquiring, as further information about the database function process details to be executed by the database management system, a ratio of execution of the process.

7. The device according to claim 2, wherein:

the administrative device includes:

means for further acquiring, as the acquired information, information about performance of rerun of processes after abnormal termination of the database management system and information about rerun time settings after abnormal termination of the database management system; and means for creating planned cache space settings for logs which the database management system outputs as the planned cache space settings on the storage device.

8. The device according to claim 2, wherein:

the administrative device includes:

means for further acquiring, as information about the database function process details to be executed by the database management system, information about size of data to be accessed during the process execution, information about distribution of access, to data to be accessed during the process execution, and information about cache space available in the database management system and the storage device, and means for creating planned cache space settings for tables and indexes which are data which the database management system manages as the planned cache space settings on the storage device.

9. The device according to claim 5, wherein:

the storage device includes means for acquiring operating statistics information about access to the cache and the database management system includes means for acquiring operating statistics information about wait occurrences when accessing tables and indexes which the database management system manages; and the administrative device includes means for further acquiring, as the acquired information, the cache access related operating statistics information as well as the operating statistics information about wait occurrences when accessing the tables and indexes, and means for creating planned change to cache space settings for tables and indexes which the database management system manages as the planned cache space settings on the storage device.

10. The device according to claim 1, wherein the administrative device includes means for acquiring, as information about the database function process details to be executed by the database management system, the number of expected data pages to access in tables and indexes which are data which the database management system manages during the process.

11. The device according to claim 10, wherein:
the administrative device includes:
means for further acquiring, as information about the database function process details to be executed by the database management system, a ratio of execution of the process, information about size of data to be accessed during the process execution, information about distribution of access to data to be accessed during the process execution, and information about cache space available in the database management system and the storage device; and
means for creating planned cache apace settings for tables and indexes which are data which the database management system manages as the planned cache space settings on the storage device.

12. The device according to claim 10, wherein:
the storage device includes means for acquiring operating statistics information about access to the cache and the database management system includes means for acquiring operating statistics information about wait occurrences when accessing tables and indexes which the database management system manages; and
the administrative device further includes means for acquiring, as the acquired information, the cache access related operating statistics information as well as the operating statistics information about wait occurrences when accessing the tables and indexes, and means for creating planned change to cache space settings for tables and indexes which the database management system manages.

13. The device according to claim 1, wherein the means for acquiring information acquire data mapping information from the database management system, a file system, and a volume manager included on the computer.

14. The device according to claim 1, wherein:
the administrative device includes:
means for further acquiring, as the acquired information, information about: performance of rerun of processes after abnormal termination of the database management system and information about rex-un time settings after abnormal termination of the database management system, and
means for creating planned cache space settings for logs which the database management system outputs as the planned cache space settings on the storage device.

15. The device according to claim 1, wherein:
the administrative device includes:
means for further acquiring, as information about the database function process details to be executed by the database management system, information about size of data to be accessed during the process execution, information about distribution of access to data to be accessed during the process execution, and information about cache apace available in the database management system and the storage devices and means for creating planned cache space settings for tables and indexes which are data which the database management system manages as the planned cache space settings on the storage device.

16. The device according to claim 1, wherein:
the storage device includes means for acquiring operating statistics information about access to the cache and the database management system includes means for acquiring operating statistics information about wait occurrences when accessing tables and indexes which the database management system manages; and
the administrative device includes means for further acquiring, as the acquired information, the cache access related operating statistics information as well as the operating statistics information about wait occurrences when accessing the tables and indexes, and means for creating planned change to cache space settings for tables and indexes which the database management system manages as the planned cache space settings on the storage device.

17. The device according to claim 1, wherein:
the administrative device includes:
means for further acquiring, as information about the database function process details to be executed by the database management system, a ratio of execution of the process, information about size of data to be accessed during the process execution, information about distribution of access to data to be accessed during the process execution, and information about cache space available in the database management system and the storage device; and
means for creating planned cache apace settings for tables and indexes which are data which the database management system manages as the planned cache space settings on the storage device.

18. The device according to claim 1, wherein:
the storage device includes means for acquiring operating statistics information about access to the cache and the database management system includes means for acquiring operating statistics information about wait occurrences when accessing tables arid indexes which the database management system manages; and
the administrative device further includes means for acquiring, as the acquired information, the cache access related operating statistics information as well as the operating statistics information about wait occurrences when accessing the tables and indexes, arid means for creating planned change to cache space settings for tables and indexes which the database management system manages.

19. A computer-executable program embodied on a computer-readable medium for setting cache space, which is executed in a data processing system comprising a computer on which a database management system runs and a storage device, which includes databases on which data is stored under management of the database management system end a data cache which temporarily retains data from the databases, the computer-executable program comprising:
means for acquiring information about database function process details to be executed by the database management system;
means for acquiring information about data mapping from the computer and the storage device;
means for creating planned cache space settings, using the acquired information said database function process details and about said data mapping; and
means for directing the storage device to activate cache space settings according to the planned cache space settings.

20. A method for managing a data cache in a data processing system including a storage device which includes disk storage units on which data is stored and a data cache which temporarily retains at least a part of the data that is stored on the disk storage units, a computer on which a database management system (DBMS) program which manages storing data to the storage device is run, the computer carrying out data processing, and an administrative device provided with a system management program for supervising and managing the computer and the storage device, wherein the storage device, the computer, arid the administrative device are interconnected via a network, the method comprising the steps of:
determining a maximum number of processes that can be executed during a rerun, referring to process design information;
obtaining SQL statements to do INSERT/UPDATE from the processes and expected repetition rates of the SQL statements;
determining maximum data size of logs to be output by the SQL statement to do UPDATE/INSERT;
calculating log data size per process from the maximum data size of logs;
estimating log size required, based on the log data size per process and the maximum number of processes that can be executed during a rerun;
setting cache space as much as or more than the log size required during a rerun to reside on the data cache; and
allocating cache storage areas according to cache space settings thus determined.

21. The method for managing a data cache according to claim 20, wherein, if a logical disk storage unit to which logs should be stored belongs to a free cache group, the free cache group is defined and a part or all of the cache space as much as or more than the log size required during a rerun is allocated to the cache group.

22. A method for managing a data cache in a data processing system including a storage device which includes disk storage units on which data is stored and a data cache which temporarily retains at least a part of the data that is stored en the disk storage units, a computer which includes a cache and on which a database management system (DBMS) program which manages storing data to the storage device is run, and an administrative device provided with a system management program for supervising and managing the computer and the storage device, the method comprising the steps of: allocating equal amounts of space in the cache of the DBMS and the data cache of the storage device to all data structures;
specifying a cache effect function for each data structure and allocating space in the cache of the DBMS to each data structure, using the cache effect function;
specifying the cache effect function and allocating space in the data cache to each data structure, using the cache effect functions and
directing one of the DBMS and the storage device to activate cache space allocations thus determined.

23. The method of claim 22, further comprising;
determining the data quantity of data pages to store data except leaf nodes for each data structure and allocating space available in the cache of the DBMS as much as the data quantity thus determined to each data structure; and
determining the data quantity of data pages to store leaf nodes and allocating space available in the data cache of the storage device as much as the data quantity thus determined and space available in the cache of the DBMS by a predetermined ratio to the corresponding data cache space to each data structure.

24. The method of claim 22, further comprising the steps of:
in the data processing system,
virtualizing the disk storage units into a plurality of logical disk storage units;
dividing the whole data cache space into groups having storage areas in Units of the logical disk storage units;
identifying a logical disk storage unit to which logs should be stored and a cache group under which the logical dick storage unit falls from mapping information; and
directing the storage device to activate the cache group thus identified and cache space settings of storage areas for the cache group.

25. The method of claim 22, wherein said data structures include table and index data.

26. The method of claim 22, wherein the DBMS manages its own cache and the data cache of the storage device, regarding the caches as a single cache entity.

27. The method of claim 22, further comprising the steps of:
issuing a caching request from the DBMS to the storage device to cache data from a storage location within the storage device to the data cache; and
issuing a write request with the caching request to cache data which has just been written to the cache within the DBMS to the data cache within the storage device.

28. A method for optimum caching management for data cache in a data processing system including a storage device which includes disk storage units on which data is stored and a data cache which temporarily retains at least a part of the data that is stored on the disk storage units, a computer on which a database management system (DBMS) program which manages storing data to the storage device is run, and an administrative device provided with a system management program for supervising and managing the computer and the storage device, the method for optimum caching management for the data cache comprising the steps of:
checking statistics about a count of occurrences of wait when accessing data pages of data structures within the DBMS;
identifying processes involving access to a data structure for which it has been determined that wait has occurred with high frequency and obtaining the number of expected data pagan to access in the data structure;
checking for a process which takes long execution time and accessed many times the data structure for which wait has occurred with high frequency among the processes involving access to the data structure;
tailoring cache allocations to enhance a cache hit rate of the data to be accessed during the process execution to shorten the execution time of the process; and
directing the storage device to activate change to data cache allocations according to tailored cache allocations.

29. The method for optimum management for data cache according to claim 28, further comprising the step of tailoring cache allocations to enhance the cache hit rate of the data to be accessed during the execution of the processes and reduce the total sum of execution time of the processes as a whole.

* * * * *